US011294175B2

(12) United States Patent
Lee et al.

(10) Patent No.: US 11,294,175 B2
(45) Date of Patent: Apr. 5, 2022

(54) HEAD UP DISPLAY DEVICE

(71) Applicant: LG INNOTEK CO., LTD., Seoul (KR)

(72) Inventors: Gi Seok Lee, Seoul (KR); Tae Kyung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 279 days.

(21) Appl. No.: 16/339,940

(22) PCT Filed: Sep. 29, 2017

(86) PCT No.: PCT/KR2017/010909
§ 371 (c)(1),
(2) Date: Apr. 5, 2019

(87) PCT Pub. No.: WO2018/066912
PCT Pub. Date: Apr. 12, 2018

(65) Prior Publication Data
US 2020/0041788 A1 Feb. 6, 2020

(30) Foreign Application Priority Data

Oct. 5, 2016 (KR) .................. 10-2016-0128158
Oct. 5, 2016 (KR) .................. 10-2016-0128366

(51) Int. Cl.
*G02B 27/01* (2006.01)
(52) U.S. Cl.
CPC ..... *G02B 27/0101* (2013.01); *G02B 27/0149* (2013.01); *B60K 2370/1529* (2019.05)
(58) Field of Classification Search
CPC ............ G02B 27/0101; G02B 27/0149; G02B 5/0263; G02B 5/0278; G02B 2027/013;
(Continued)

(56) References Cited

U.S. PATENT DOCUMENTS 2,254,961 A * 9/1941 Harris ................ F21V 13/04
362/327
4,427,265 A * 1/1984 Suzuki ................ G02B 5/0252
359/599
(Continued)

FOREIGN PATENT DOCUMENTS

KR 10-2013-0106350 A 9/2013
KR 10-2016-0019965 A 2/2016
(Continued)

OTHER PUBLICATIONS

International Search Report in International Application No. PCT/KR2017/010909, filed Sep. 29, 2017.

*Primary Examiner* — George G. King
(74) *Attorney, Agent, or Firm* — Saliwanchik, Lloyd & Eisenschenk

(57) ABSTRACT

An embodiment of a head up display device may comprise: a light source unit; a first light transmitting member which is disposed opposite to the light source unit in the optical axis direction; a second light transmitting member which is disposed opposite to the first light transmitting member in the optical axis direction; a display unit which is disposed opposite to the second light transmitting member in the optical axis direction and to which light having passed through the second light transmitting member is incident; and a light diffusing member which is disposed between the second light transmitting member and the display unit, wherein the display unit is inclined with respect to the optical axis direction, and the light diffusing member is inclined with respect to the optical axis direction so as to be parallel to the display unit.

17 Claims, 21 Drawing Sheets

(58) Field of Classification Search
CPC .............................. G02B 5/0215; B60K 35/00; B60K 2370/334; B60K 2370/23; B60K 2370/1529; B64D 43/00
USPC ........................................................ 359/599
See application file for complete search history.

(56) References Cited

U.S. PATENT DOCUMENTS

| | | | | |
|---|---|---|---|---|
| 5,757,557 | A * | 5/1998 | Medvedev | G02B 19/0047 359/708 |
| 6,324,010 | B1 * | 11/2001 | Bowen | B29D 11/00403 359/622 |
| 6,429,906 | B1 * | 8/2002 | Sekine | G02B 27/145 349/9 |
| 10,241,365 | B2 * | 3/2019 | Pierre | G02B 19/0066 |
| 2004/0062040 | A1 * | 4/2004 | Blume | G02F 1/133603 362/231 |
| 2007/0086204 | A1 * | 4/2007 | Chinniah | G02B 19/0028 362/520 |
| 2011/0134362 | A1 | 6/2011 | Parker et al. | |
| 2014/0022645 | A1 | 1/2014 | Matsuura et al. | |
| 2014/0240839 | A1 * | 8/2014 | Yang | G02B 5/021 359/599 |
| 2015/0138487 | A1 * | 5/2015 | Hirayama | G02F 1/1336 349/65 |
| 2016/0186958 | A1 * | 6/2016 | Nagahara | F21V 5/007 362/84 |
| 2017/0139206 | A1 * | 5/2017 | Sugikawa | G02B 27/0101 |
| 2017/0299922 | A1 * | 10/2017 | Matsuura | G02F 1/133606 |
| 2017/0363866 | A1 * | 12/2017 | Murzyn | B60K 37/04 |
| 2018/0259807 | A1 * | 9/2018 | Yuuki | G02F 1/133606 |
| 2019/0072799 | A1 * | 3/2019 | Narushima | G02B 27/01 |

FOREIGN PATENT DOCUMENTS

| | | | | |
|---|---|---|---|---|
| WO | WO-2015/159030 A1 | | 10/2015 | |
| WO | WO2016047621 | * | 3/2016 | ....... G02F 1/133606 |

* cited by examiner

HEAD UP DISPLAY DEVICE

CROSS-REFERENCE TO RELATED APPLICATIONS

This application is the U.S. national stage application of International Patent Application No. PCT/KR2017/010909, filed Sep. 29, 2017; which claims the benefit under 35 U.S.C. § 119 of Korean Application Nos. 10-2016-0128158, filed Oct. 5, 2016; and 10-2016-0128366, filed Oct. 5, 2016; all of which are hereby incorporated by reference in their entirety.

TECHNICAL FIELD

Embodiments relate to a head up display device.

BACKGROUND ART

Head up displays (HUDs) are known as being introduced for security of the front view of a pilot in an aircraft in order to enable the pilot to identify various specifications without viewing an instrument panel with his head down while observing the scene in front of the aircraft, in accordance with the origin of head up displays.

In particular, such a head up display is generally mounted to a vehicle in order to enable passengers of the vehicle to easily identify a state of the vehicle and a state around the vehicle, for safety of the passengers and prevention of traffic accidents. Head up display technologies associated with vehicles are being steadily developed.

A head up display device may display, on a front window, namely, a windshield, disposed in a visible field of passengers, vehicle specifications, information on a vehicle, and information around the vehicle, which are required for driving of the vehicle.

Since the head up display device provides such information within the visible field of passengers, the passengers may primarily concentrate only on a road traffic situation. In particular, the driver may remarkably reduce the number of alternately observing the instrument panel and the road traffic situation.

Accordingly, the head up display device may alleviate fatigue of the passengers of the vehicle including the driver, and may remarkably contribute to vehicle driving safety.

DISCLOSURE

Technical Problem

Embodiments provide a head up display device having a structure capable of achieving an enhancement in uniformity of an image in a display unit.

It will be appreciated by persons skilled in the art, to which embodiments pertain, that technical problems to be solved by the embodiments are not limited to the above-described technical problems, and other technical problems will be more clearly understood from the following description.

Technical Solution

In one embodiment, a head up display device includes a light source unit, a first light transfer member disposed to face the light source unit in an optical axis direction, a second light transfer member disposed to face the first light transfer member in the optical axis direction, a display unit disposed to face the second light transfer member in the optical axis direction, the display unit receiving light emerging from the second light transfer member, and a light diffusion member disposed between the second light transfer member and the display unit, wherein the display unit is disposed to be inclined with respect to the optical axis direction, and the light diffusion member is disposed to be inclined with respect to the optical axis direction such that the light diffusion member is parallel to the display unit.

In another embodiment, a head up display device includes a light source unit including a light emitting element, a first light transfer member disposed to face the light source unit in a first direction, the first light transfer member including a convex lens section, a second light transfer member disposed to face the first light transfer member in the first direction, and a display unit disposed to face the second light transfer member in the first direction, the display unit receiving light emerging from the second light transfer member, wherein a center of the light emitting element is spaced apart from a center of the convex lens section in a direction perpendicular to the first direction.

Advantageous Effects

Each embodiment may enhance light diffusion effects of the light diffusion member while enhancing uniformity of light passing through the display unit by arranging the light diffusion member between the second light transfer member and the display unit, and arranging the light diffusion member and the display unit in parallel.

In each embodiment, embossed portions formed at the light diffusion member may enhance light diffusion in the light diffusion member, thereby enhancing uniformity of light incident upon the display unit after passing through the light diffusion member.

In each embodiment, the center of the light emitting element is spaced apart from the center of the convex lens section in a direction perpendicular to the first direction as the optical axis direction and, as such, there may be light uniformity enhancement effects in the display unit.

BEST MODE

Figure 1:
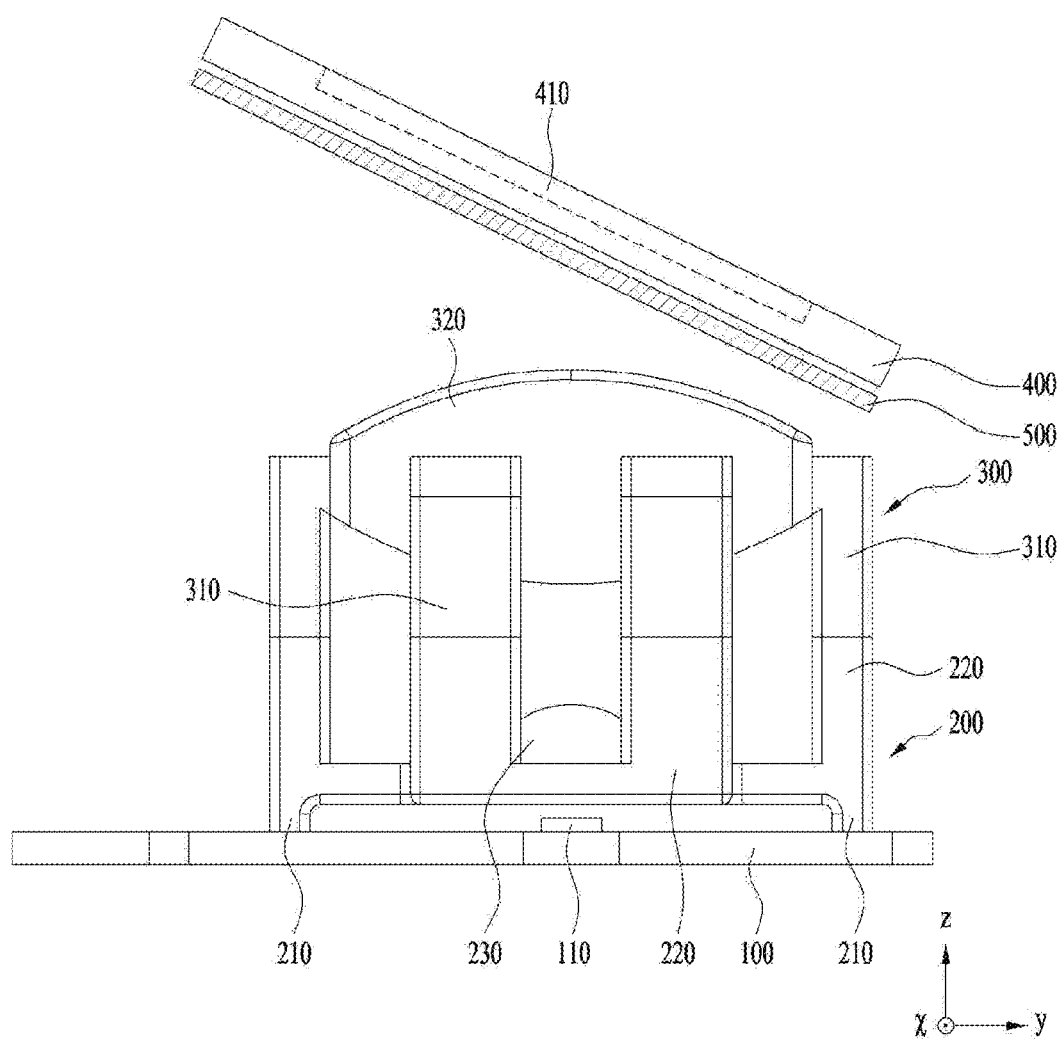
FIG. 1 is a side view illustrating a head up display device of an embodiment.

Hereinafter, preferred embodiments will be described in detail with reference to the accompanying drawings. Although embodiments are susceptible to various modifications and alternative forms, specific embodiments will be shown by way of example in the drawings and will herein be described in detail. It should be understood, however, that there is no intent to limit the invention to the particular forms disclosed, but on the contrary, embodiments are to cover all modifications, equivalents, and alternatives falling within the spirit and scope of embodiments.

In the meantime, although terms including an ordinal number, such as first or second, may be used to describe a variety of constituent elements, the constituent elements are not limited to the terms, and the terms are used only for the purpose of discriminating one constituent element from other constituent elements. In addition, terms specifically defined herein in consideration of the configurations and functions in embodiments are used only to disclose embodiments without limiting the scope of embodiments.

In the following description of embodiments, it will be understood that, when an element is referred to as being "on" or "under" another element, it can be directly on or under the other element or can be indirectly formed such that an intervening element is also present. Furthermore, when the expression "on" or "under" is used herein, it may involve not only the upward direction, but also the downward direction, with reference to one element.

In addition, it will be understood that relative terms used hereinafter such as "on"/"above"/"over" and "under"/"below"/"beneath" may be construed only to distinguish one element from another element without necessarily requiring or involving a certain physical or logical relation or sequence between the elements.

Furthermore, in the drawings, a Cartesian coordinate system (x, y, z) may be used. In the drawings, the x-axis and the y-axis mean a plane perpendicular to an optical axis. For convenience, the optical axis direction (z-axis direction) may be referred to as a first direction, the x-axis direction may be referred to as a second direction, and the y-axis direction may be referred to as a third direction.

FIG. 1 is a side view illustrating a head up display device of an embodiment. The display device of the embodiment may include a light source unit 100, a first light transfer member 200, a second light transfer member 300, a display unit 400, and a light diffusion unit 500.

The light source unit 100 functions to emit light. Light emitted from the light source unit 100 may be incident upon the display unit 400 after passing through the first light transfer member 200, the second light transfer member 300 and the light diffusion member 500.

In this case, an image displayed on the display unit 400 is carried by light emitted from the light source unit 100, and is then projected onto a windshield of a vehicle or the like, and, as such, a passenger of the vehicle may view the image projected onto the windshield.

The light source unit 100 may be provided with a light emitting element 110 for emitting light. For the light emitting element 110, a product having high brightness and low energy consumption may be suitable. For the light emitting element 110, for example, a light emitting diode (LED) or the like may be used.

The light source unit 100 may be manufactured in the form of, for example, a printed circuit board. In this case, accordingly, the light source unit 100 may be configured by mounting, on a printed circuit board, at least one light emitting element 110, and a positive or passive element and a circuit line, which are needed for supply of electric power to the light emitting element 110.

The display unit 400 is disposed to face the second light transfer member 300 in an optical axis direction and, as such, light passing through the second light transfer member 300 may be incident upon the display unit 400. The display unit 400 may include an image panel 410 for reproducing an image.

In this case, the image panel 410 may be embodied as a liquid crystal display (LCD), a plasma display panel (PDP), an organic light emitting diode (OLED) or the like.

The display unit 400 may reproduce an image. When it is desired to enable the passenger to clearly view an image from the display unit 400 projected onto the windshield of the vehicle with the naked eye, additional projection light is needed.

In connection with this, light emitted from the light source unit 100 may function as projection light as described above. Accordingly, an image displayed on the display unit 400 is projected onto the windshield of the vehicle while being carried by the light emitted from the light source unit 100 and, as such, the passenger of the vehicle may view the image projected onto the windshield.

Meanwhile, when it is desired to adjust a projection angle of the image projected from the display unit 400, adjustment of the image projection angle may be achieved, for example, by arranging a prism, a mirror or the like at a suitable position between the display unit 400 and the windshield.

The first light transfer member 200 is disposed to face the light source unit 100 in the optical axis direction and, as such, light emitted from the light source unit 100 may pass through the first light transfer member 200. In this case, the first light transfer member 200 may function to diffuse light incident from the light source unit 100 over a plane perpendicular to the optical axis direction.

Light emitted from the light emitting element 110 may have a smaller area in a plane perpendicular to the optical axis direction than the area of the image panel 410. In connection with this, the first light transfer member 200 may diffuse light emitted from the light emitting element 110.

To this end, the first light transfer member 200 may include a convex lens section 230. Light incident from the light source unit 100 may pass through the convex lens section 230. That is, light incident from the light emitting element 110 upon the first light transfer member 200 may be concentrated on the convex lens section 230.

Accordingly, the convex lens section 230 may be disposed at a position corresponding, in the optical axis direction, to a position where the light emitting element 110 is disposed. Light may be refracted by a convex lens of the convex lens section 230 while passing through the convex lens section 230 and, as such, may be diffused.

The second light transfer member 300 may be disposed to face the first light transfer member 200 in the optical axis direction. Light emerging from the first light transfer member 200 may pass through the second light transfer member 300.

Meanwhile, light emerging from the first light transfer member 200 may be incident upon the light diffusion member 500, which will be described later, after passing through the second light transfer member 300.

The second light transfer member 300 causes light incident thereupon to have a shape corresponding to the shape and area of the image panel 410. The second light transfer member 300 also causes, together with the light diffusion member 500, the light to be distributed in a plane parallel to the display unit 400 while having uniform brightness.

In order to accomplish such purposes, the second light transfer member 300 may include a light transmitting portion 320 formed to have a curved shape having an upwardly convex upper surface and a downwardly convex lower surface. Light passes through the light transmitting portion 320.

In accordance with the curved shape of the light transmitting portion 320, light emerging from the light transmitting portion 320 may have uniform brightness in a plane parallel to the display unit 400 while having a shape corresponding to the shape and area of the image panel 410.

For example, the light transmitting portion 320 may produce light having a shape and an area, which correspond to those of the image panel 410, by adjusting an angle of light incident thereupon with respect to the optical axis direction of the light. To this end, the light transmitting portion 320 may be formed to have a curved shape having an upwardly convex upper surface and a downwardly convex lower surface, in order to adjust the angle of the incident light with respect to the optical axis direction of the incident light.

The light diffusion member 500 may be disposed between the second light transfer member 300 and the display unit 400. In this case, the light diffusion member 500 may have, for example, a film structure.

Light emerging from the first light transfer member 200 may be incident upon the light diffusion member 500 after passing through the second light transfer member 300. As illustrated in FIG. 1, the light diffusion member 500 may be disposed in parallel to the display unit 400.

The light diffusion member 500 may function to diffuse light emerging from the second light transfer member 300 over a plane parallel to the display unit 400 while causing the light to have uniform brightness. Light emerging from the second light transfer member 300 may exhibit brightness non-uniformly distributed in a plane parallel to the display unit 400 when viewed in the plane.

For example, the light in the plane may exhibit high brightness at a position corresponding to the light transmitting portion 320 of the second light transfer member 330, but may exhibit gradually reduced brightness at a position gradually farther from the position corresponding to the light transmitting portion 320.

In this case, the light diffusion member 500 may uniformize the brightness of light in the above-described plane in accordance with a method of reducing light transmissivity at the position corresponding to the light transmitting portion 320 while increasing light transmissivity at other positions.

Figure 2:
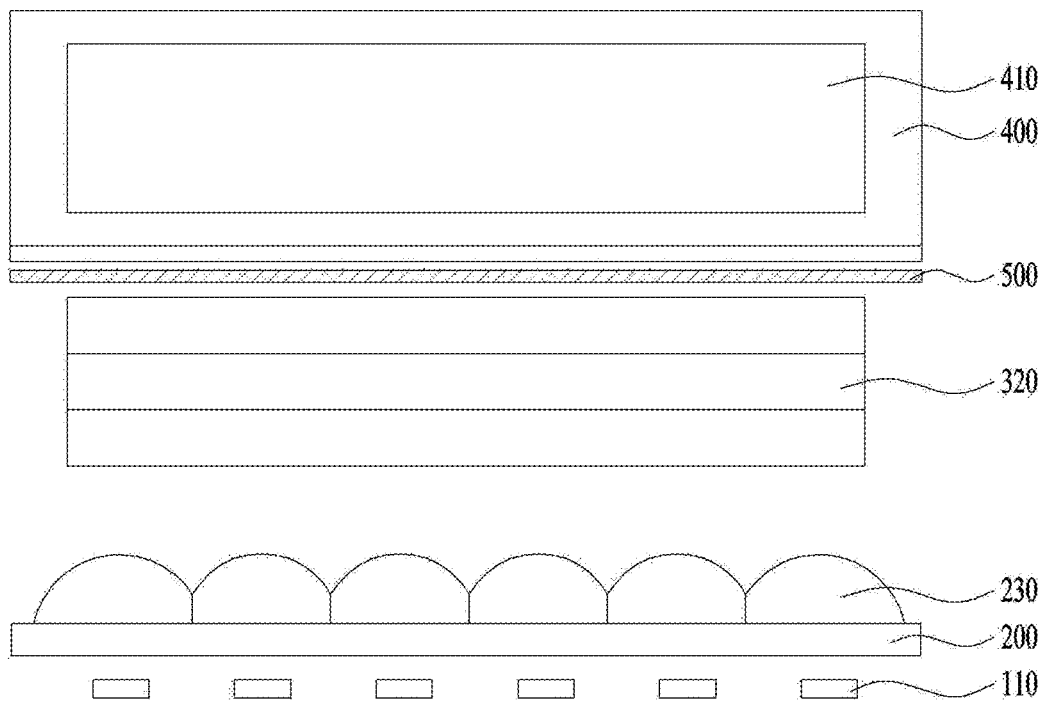
FIG. 2 is a front view schematically illustrating a part of the head up display device of the embodiment.
Figure 3:
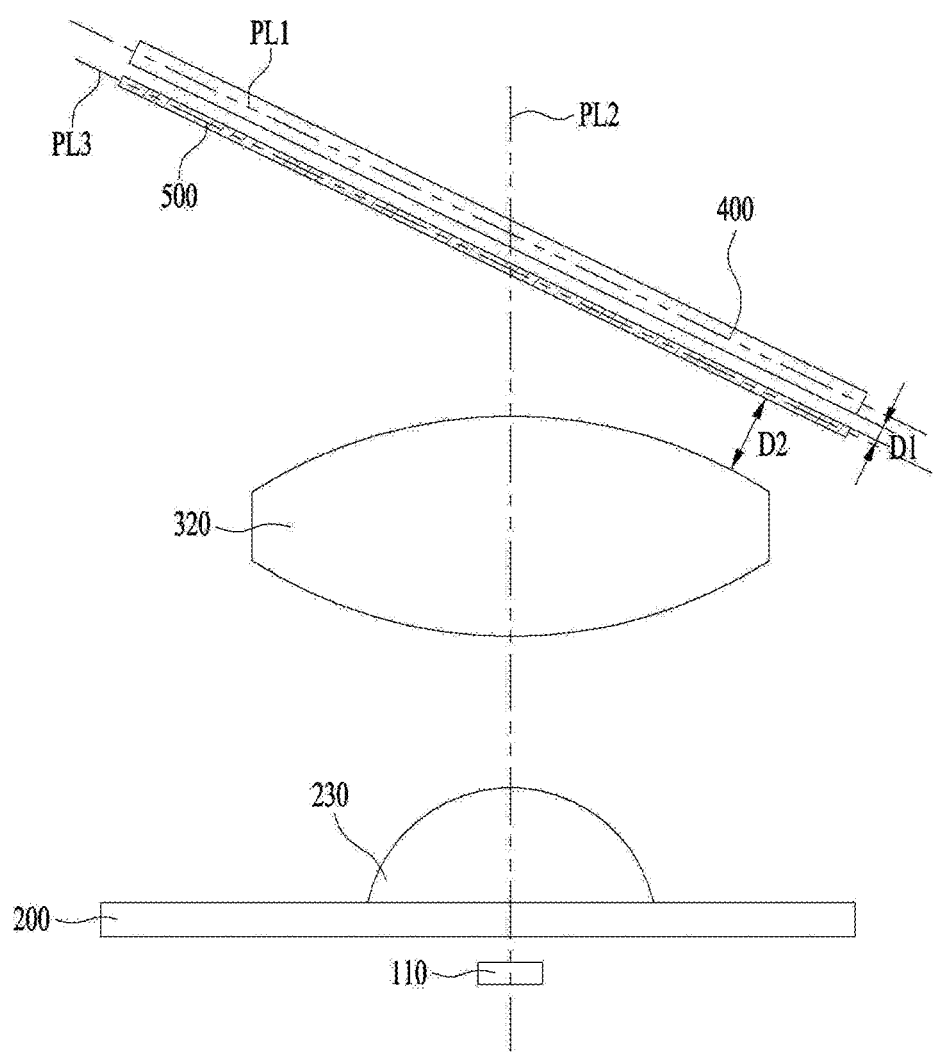
FIG. 3 is a side view corresponding to FIG. 2.

FIG. 2 is a front view schematically illustrating a part of the head up display device of the embodiment. FIG. 3 is a side view corresponding to FIG. 2.

As illustrated in FIG. 2, in the embodiment, the light source unit 100 may include a plurality of light emitting elements 110 disposed at uniform intervals. The convex lens section 230 may include a plurality of convex lenses disposed at positions respectively corresponding to the light emitting elements 110 in the optical axis direction.

In accordance with the above-described configuration, light emitted from each light emitting element 110 may be diffused while passing through the convex lens disposed to correspond to the light emitting element 110 in the optical axis direction. The light diffused while passing through the convex lens section 230 may be further diffused while passing through the light transmitting portion 320.

The display unit 400 may be disposed to be inclined with respect to the optical axis direction. Generally, an image provided to the passenger of the vehicle after being reproduced from the display unit 400 is projected onto the windshield of the vehicle and, as such, the passenger views the image projected onto the windshield, that is, a virtual image.

In this case, since the windshield of the vehicle is generally disposed to be inclined with respect to the ground surface, it is necessary to adjust the angle, at which light carrying an image emitted from the display unit 400 is projected, in order to enable the image from the display unit 400 to be projected onto the windshield without being distorted.

To this end, the display unit 400 is disposed to be inclined with respect to the optical axis direction and, as such, the angle, at which light carrying an image emitted from the display unit 400 is projected, may be appropriately adjusted.

In the embodiment, the light diffusion member 500 may be disposed between the second light transfer member 300 and the display unit 400. In accordance with this arrangement, light diffusion effects of the light diffusion member 500 may be enhanced. That is, light diffusion effects of the light diffusion member 500 are gradually enhanced as the light diffusion member 500 is disposed at a position farther from the light source unit 100 and, as such, uniformity of light emitted from the light source unit 100 may be enhanced.

In the embodiment, accordingly, light diffusion effects of the light diffusion member 500 may be maximized when the light diffusion member 500 is disposed between the second light transfer member 300 and the display unit 400.

Meanwhile, the light diffusion member 500 may be disposed to be inclined with respect to the optical axis direction such that the light diffusion member 500 is parallel to the display unit 400. In accordance with this arrangement, uniformity of light passing through the display unit 400 may be gradually enhanced as the light diffusion member 500 is disposed at a position nearer to the display unit 400.

That is, when the light diffusion member 500 and the display unit 400 are disposed in parallel, the distance between the light diffusion member 500 and the display unit 400 is uniform and, as such, it may be possible to avoid degradation in uniformity of light incident upon the image panel 410 of the display unit 400 after passing through the light diffusion member 500. Such light uniformity degradation may occur when the distance between the light diffusion member 500 and the display unit 400 is non-uniform. In the embodiment, accordingly, uniformity of light passing through the display unit 400 may be enhanced.

Referring to FIG. 3, a first virtual line PL1 extending in a lateral direction of the display unit 400 and a second virtual line PL2 extending in the optical axis direction may form an acute angle or an obtuse angle therebetween.

For example, referring to FIG. 3, portions of the first and second virtual lines PL1 and PL2 extending upwards from a crossing point between the first virtual line PL1 and the second virtual line PL2 may form an acute angle therebetween.

That is, the display unit 400 is disposed to be inclined with respect to the optical axis direction and, as such, the first virtual line PL1 and the second virtual line PL2 form an acute angle or an obtuse angle therebetween, and cannot cross each other at right angles.

In addition, referring to FIG. 3, a third virtual line PL3 extending in a lateral direction of the light diffusion member 500 may be parallel to the first virtual line PL1. In accordance with this arrangement, the light diffusion member 500 and the display unit 400 may be disposed in parallel in order to enhance uniformity of light passing through the display unit 400.

Furthermore, referring to FIG. 3, the minimum distance between facing surfaces of the display unit 400 and the light diffusion member 500, that is, a first distance D1, may be shorter than the minimum distance between facing surfaces of the second light transfer member 300 and the light diffusion member 500, that is, a second distance D2.

The reason why this arrangement is employed in the embodiment is because it is suitable for the light diffusion member 500 to be disposed farther from the light source unit 100 while being disposed nearer to the display unit 400, for an enhancement in uniformity of light passing through the display unit 400.

Meanwhile, in an embodiment, the light diffusion member 500 may be disposed to contact a lower surface of the display unit 400 or to adhere to the lower surface of the display unit 400. In this case, the first distance D1 may be zero.

In the embodiment, it may be possible to enhance light diffusion effects of the light diffusion member 500 and uniformity of light passing through the display unit 400 by arranging the light diffusion member 500 between the second light transfer member 300 and the display unit 400 while arranging the light diffusion member 500 and the display unit 400 in parallel.

Figure 4:
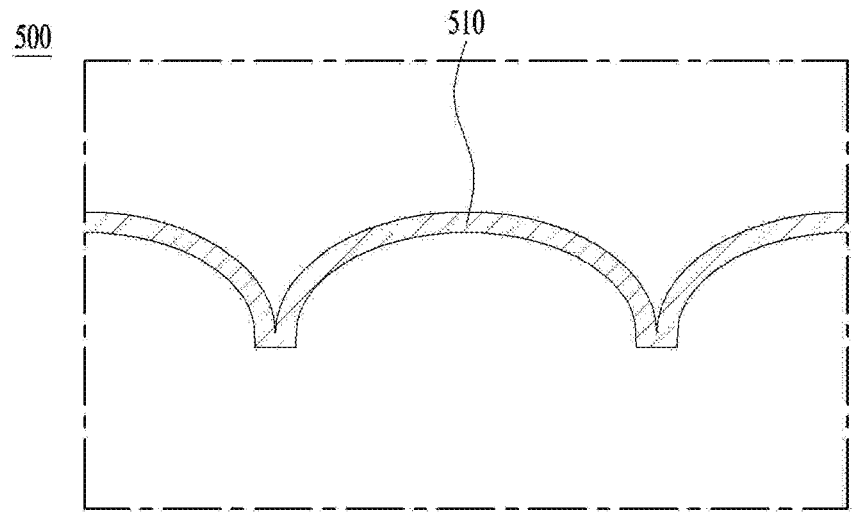
FIG. 4 is an enlarged view illustrating a part of a light diffusion member in the embodiment.
Figure 5:
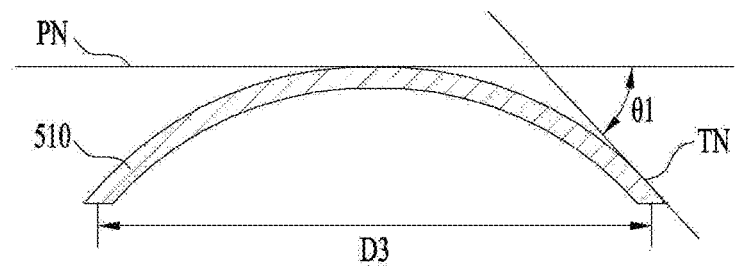
FIG. 5 is a sectional view illustrating a shape of embossed portions formed at the light diffusion member of the embodiment when viewed in a direction of a longer axis.
Figure 6:
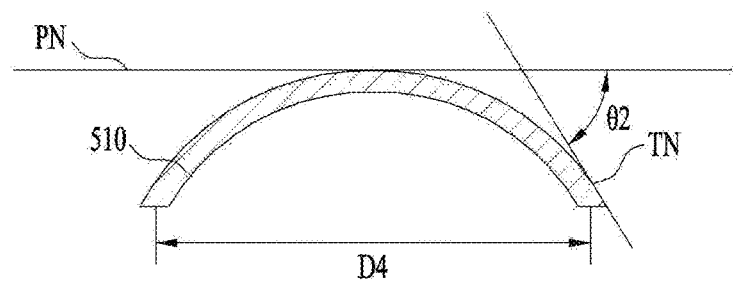
FIG. 6 is a sectional view illustrating a shape of the embossed portions of FIG. 5 when viewed in a direction of a shorter axis.

FIG. 4 is an enlarged view illustrating a part of the light diffusion member 500 in the embodiment. FIG. 5 is a sectional view illustrating a shape of embossed portions 510 formed at the light diffusion member 500 of the embodiment when viewed in a direction of a longer axis D3. FIG. 6 is a sectional view illustrating a shape of the embossed portions 510 of FIG. 5 when viewed in a direction of a shorter axis D4.

As illustrated in FIG. 4, the light diffusion member 500 may be formed with the embossed portions 510, at least a part of which has an oval shell shape or a spherical shell shape. In this case, the size of the embossed portions 510 and the number of the embossed portions 510 may be appropriately selected to maximize light diffusion effects of the light diffusion member 500 in the head up display device.

Similarly to the convex lens section 230 provided at the first light transfer member 200, the embossed portions 510 may function to enhance diffusion of light in the light diffusion member 500. The reason why diffusion of light should be enhanced through the embossed portions 510 is the same as the reason described in conjunction with the convex lens section 230.

Meanwhile, as illustrated in FIGS. 5 and 6, each embossed portion 510 may be configured such that a plane PN contacting an uppermost surface of the embossed portion 510 forms a predetermined angle with respect to a tangent line TN of another surface of the embossed portion 510.

Referring to FIG. 5, the maximum angle between the tangent line TN and the plane PN in a cross-section of each oval shell-shaped embossed portion 510 taken along the longer axis D3 of each oval shell-shaped embossed portion 510, that is, a first angle $\theta 1$, may be, for example, 5° to 30°.

On the other hand, referring to FIG. 6, the maximum angle between the tangent line TN and the plane PN in a cross-section of each oval shell-shaped embossed portion 510 taken along the shorter axis D4 of each oval shell-shaped embossed portion 510, that is, a second angle $\theta 2$, may be, for example, 10° to 60°.

In this case, the second angle $\theta 2$ may be equal to or greater than the first angle $\theta 1$. When the first angle $\theta 1$ and the second angle $\theta 2$ are equal, the embossed portion 510 may have a spherical shell shape. When the first angle $\theta 1$ and the second angle $\theta 2$ differ from each other, the embossed portion 510 may have an oval shell shape.

In the embodiment, the embossed portions 510 formed at the light diffusion member 500 enhance light diffusion in the light diffusion member 500, thereby enhancing uniformity of light incident upon the display unit 400 after passing through the light diffusion member 500.

Figure 7A:
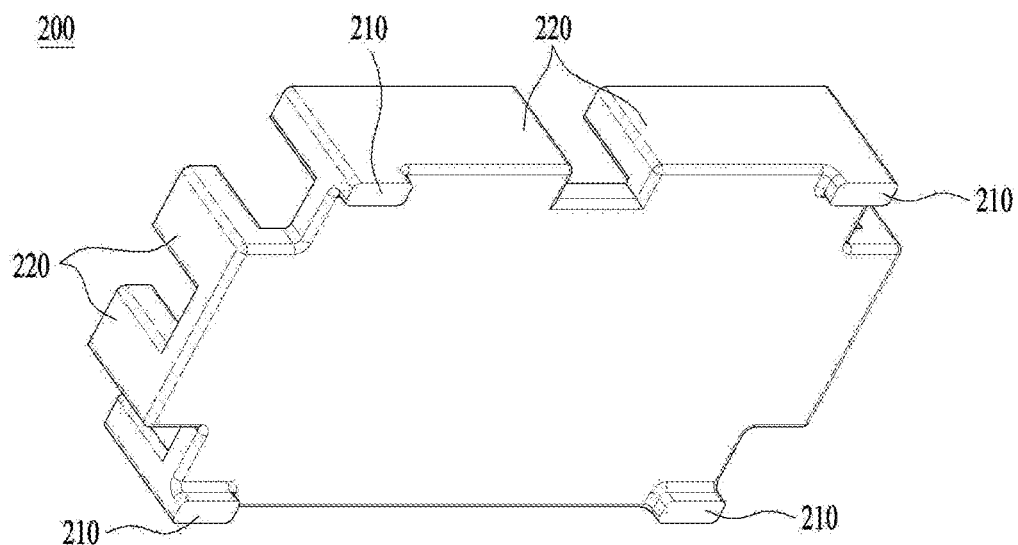
FIG. 7A is a bottom-side perspective view illustrating a first light transfer member in the embodiment.
Figure 7B:
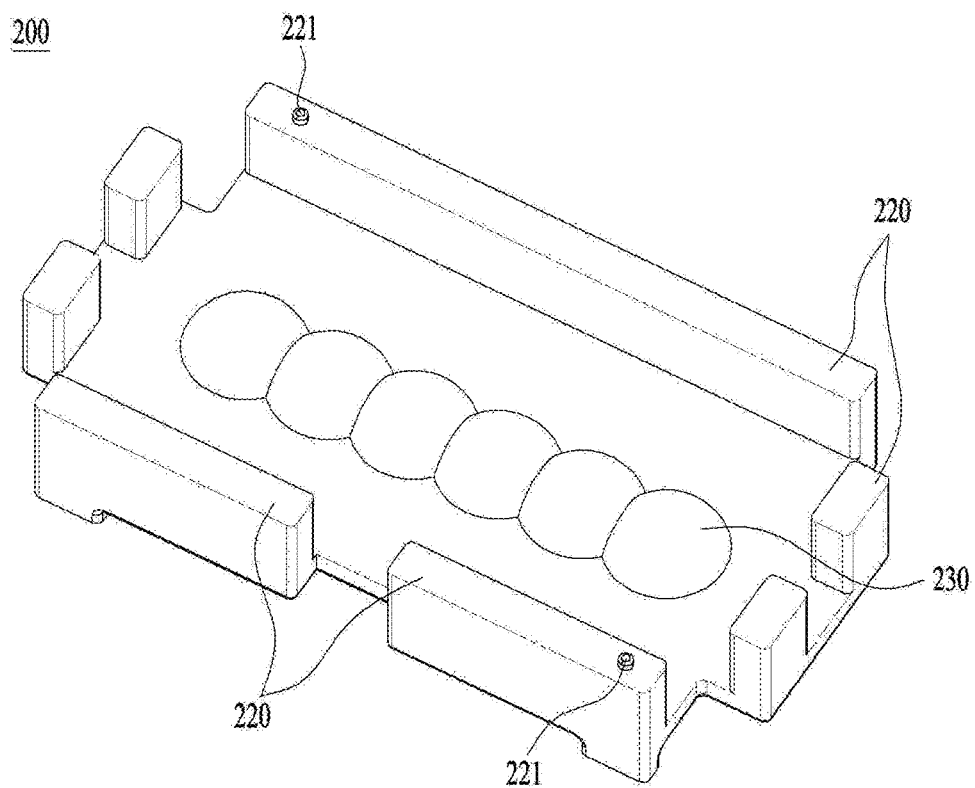
FIG. 7B is a perspective view of the first light transfer member viewed from the top side.

FIG. 7A is a bottom-side perspective view illustrating the first light transfer member 200 in the embodiment. FIG. 7B is a perspective view of the first light transfer member 200 viewed from the top side. As illustrated in FIGS. 7A and 7B, the first light transfer member 200 may be provided with first flanges 210 and second flanges 220.

The first flanges 210 may be formed at a lower surface of the first light transfer member 200 to protrude downwards from the lower surface of the first light transfer member 200. The first flanges 210 may function to space the light source unit 100 and the first light transfer member 200 from each other in the optical axis direction.

In accordance with the distance in the optical axis direction between the light source unit 100 and the first light transfer member 200, the shape of light passing through the first light transfer member 200, the brightness distribution, that is, uniformity, of the light in a plane perpendicular to the optical axis direction, and other characteristics of the light may be varied.

Accordingly, in the embodiment, the first flanges 210 are employed to adjust the distance in the optical axis direction between the light source unit 100 and the first light transfer member 200 and, as such, it may be possible to obtain an optimal light shape and optimal light uniformity.

That is, it may be possible to set the distance in the optical axis direction between the light source unit 100 and the first light transfer member 200 capable of optimizing the shape, uniformity, etc. of light passing through the first light transfer member 200 by appropriately adjusting the length of each first flange 210 in the optical axis direction.

The length of each first flange 210 in the optical axis direction may be varied in accordance with the size, concrete configuration, etc. of the head up display device. In this regard, the length of each first flange 210 in the optical axis direction may be variously set in accordance with head up display devices having various sizes and various structures.

In addition, the number of the first flanges 210 and the formation position and shape of each first flange 210 may be variously selected in accordance with the size and concrete configuration of the head up display device.

The second flanges 220 may be formed at an upper surface of the first light transfer member 200 to protrude upwards from the upper surface of the first light transfer member 200. The second flanges 220 may function to space the first light transfer member 200 and the second light transfer member 300 from each other in the optical axis direction.

In accordance with the distance in the optical axis direction between the first light transfer member 200 and the second light transfer member 300, the shape of light passing through the second light transfer member 300, the uniformity of the light, and other characteristics of the light may be varied.

Accordingly, in the embodiment, the second flanges 220 are employed to adjust the distance in the optical axis direction between the first light transfer member 200 and the second light transfer member 300 and, as such, it may be possible to obtain an optimal light shape and optimal light uniformity.

That is, it may be possible to set the distance in the optical axis direction between the first light transfer member 200 and the second light transfer member 300 capable of optimizing the shape, uniformity, etc. of light passing through the second light transfer member 300 by appropriately adjusting the length of each second flange 220 in the optical axis direction.

The length of each second flange 220 in the optical axis direction may be varied in accordance with the size, concrete configuration, etc. of the head up display device. In this regard, the length of each second flange 220 in the optical axis direction may be variously set in accordance with head up display devices having various sizes and various structures.

In addition, the number of the second flanges 220 and the formation position and shape of each second flange 220 may be variously selected in accordance with the size and concrete configuration of the head up display device.

Figure 8:
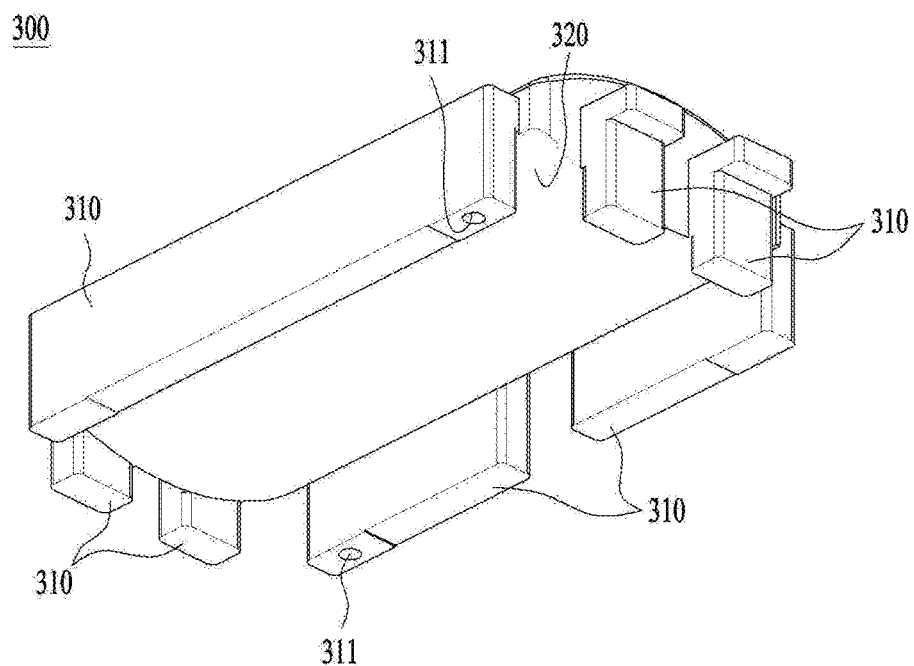
FIG. 8 is a bottom-side perspective view illustrating a second light transfer member in the embodiment.

FIG. 8 is a bottom-side perspective view illustrating the second light transfer member 300 in the embodiment. As illustrated in FIG. 8, the second light transfer member 300 may include third flanges 310.

The third flanges 310 may be formed at side surfaces of the light transmitting portion 320. The third flanges 310 may be formed to protrude downwards of the second light transfer member 300 while corresponding to the second flanges 220, respectively. Similarly to the second flanges 220, the third flanges 310 may function to space the first light transfer member 200 and the second light transfer member 300 from each other in the optical axis direction. In the following description, the description of the third flanges 310 overlapping with that of the second flanges 220 will be omitted.

It may be possible to set the distance in the optical axis direction between the first light transfer member 200 and the second light transfer member 300 capable of optimizing the shape, uniformity, etc. of light passing through the second light transfer member 300 by appropriately adjusting the lengths of each second flange 220 and each third flange 310 in the optical axis direction.

In the embodiment, it may be possible to optimize the shape, uniformity, etc. of light passing through the first light transfer member 200 and the second light transfer member 300 after being emitted from the light source unit 100 by appropriately adjusting the lengths of each first flange 210, each second flange 220 and each third flange 310 in the optical axis direction.

Meanwhile, the first light transfer member 200, the light diffusion member 500 and the second light transfer member 300 may be made of a light transmissive material. In addition, the image panel 410 may be formed using a light transmissive material and a light transmissive structure allowing light emerging from the second light transfer member 300 to pass therethrough.

As illustrated in FIG. 7B and FIG. 8, the first light transfer member 200 may include first protrusions 221, and the second light transfer member 300 may include first grooves 311.

That is, the first protrusions 221 may be formed at upper surfaces of the second flanges 220, respectively. The first grooves 311 may be formed at lower surfaces of the third flanges 310 at positions corresponding to the first protrusions 221 such that the first protrusions 221 are inserted into the first grooves 311, respectively.

It is suitable for the first light transfer member 200 and the second light transfer member 300 to be disposed at designed positions in a plane perpendicular to the optical axis direction, that is, an x-y plane, respectively. When the first light transfer member 200 and the second light transfer member 300 escape from the designed positions thereof in the x-y plane beyond an allowable range, the shape, uniformity, etc. of light passing through the second light transfer member 300 may differ from the previously set shape, uniformity, etc. As a result, the quality of the image projected onto the windshield of the vehicle may be degraded.

In the embodiment, the first protrusions 221 are inserted into the first grooves 311, respectively, and, as such, the first light transfer member 200 and the second light transfer member 300 may be disposed at designed positions thereof in the x-y plane, respectively. Accordingly, it may be possible to inhibit the first light transfer member 200 and the second light transfer member 300 from escaping from the designed positions thereof in the x-y plane beyond an allowable range.

The first protrusions 221 may be provided in a suitable number so as to be disposed at appropriate positions on the upper surfaces of the second flanges 220, respectively. The first grooves 311 may be provided in the same number as the first protrusions 221 so as to be disposed at positions corresponding to the first protrusions 221 in the optical axis direction on the lower surfaces of the third flanges 310, respectively.

In another embodiment, the first protrusions 221 and the first grooves 311 may be interchanged in position in the optical axis direction. That is, the first protrusions 221 may be formed at the lower surfaces of the third flanges 310, and the first grooves 311, into which the first protrusions 221 are inserted, may be formed at the upper surfaces of the second flanges 220 at positions corresponding to the first protrusions 221, respectively.

Figure 9:
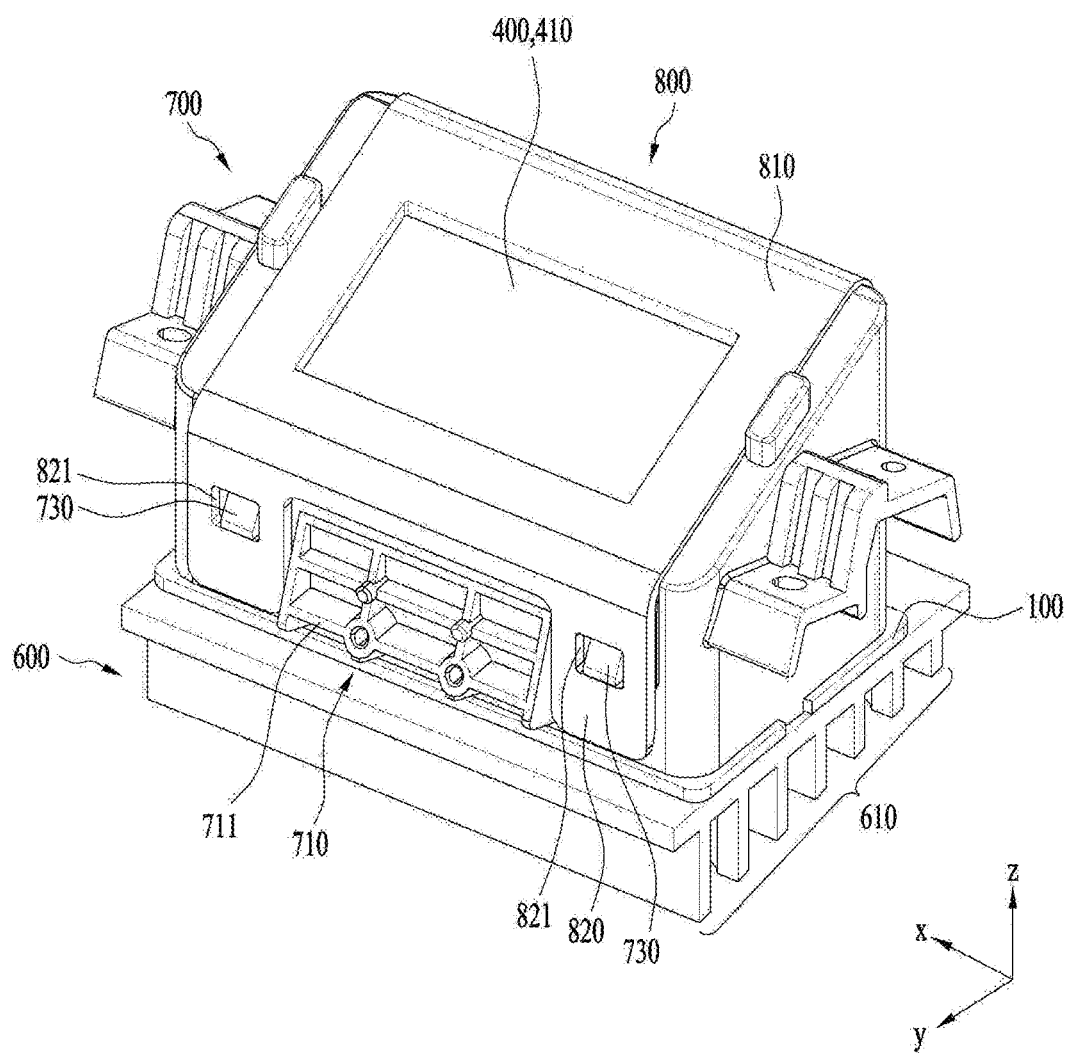
FIG. 9 is a perspective view illustrating coupled states of a first heat dissipation member, a casing and a holder to the embodiment of FIG. 1.
Figure 10:
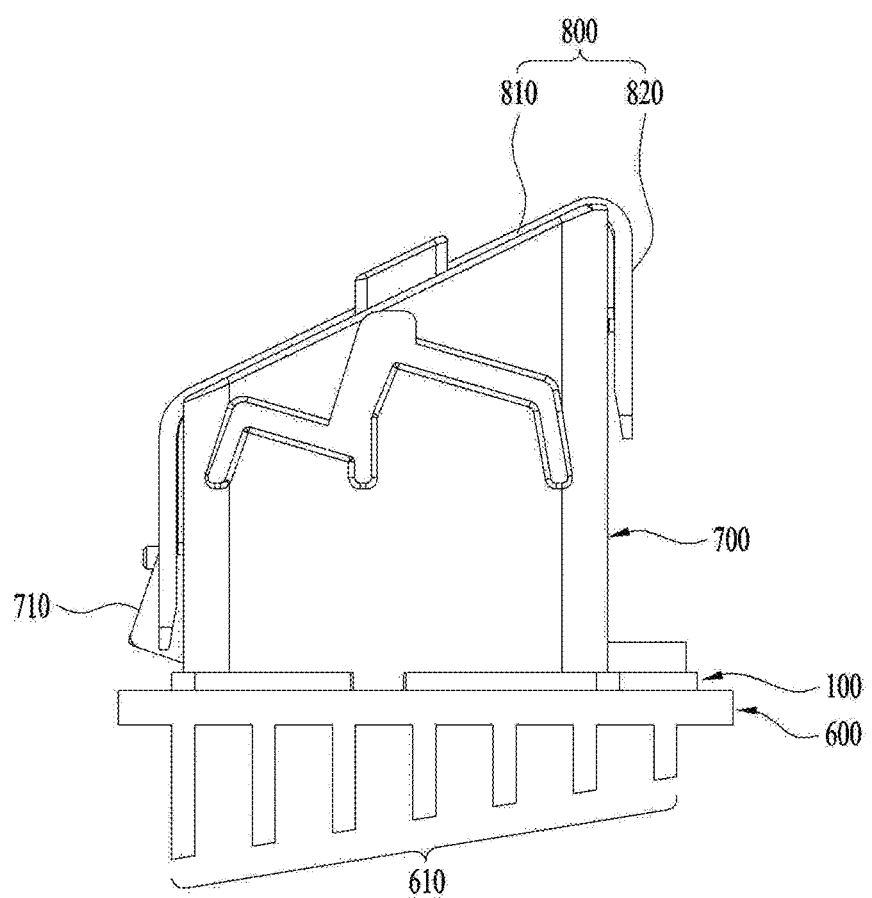
FIG. 10 is a side view corresponding to FIG. 9.

FIG. 9 is a perspective view illustrating coupled states of a first heat dissipation member 600, a casing 700 and a holder 800 to the embodiment of FIG. 1. FIG. 10 is a side view corresponding to FIG. 9. The head up display device of the embodiment may further include the first heat dissipation member 600, the casing 700, and the holder 800.

The first heat dissipation member 600 may be coupled to the light source unit 100, to be disposed beneath the light source unit 100. The first heat dissipation member 600 may include a plurality of first heat dissipation fins 610. The first heat dissipation member 600 may be provided to dissipate heat generated from the light source unit 100.

Heat may be generated from the light source unit 100 during light emission thereof. Accordingly, it is necessary to inhibit the light source unit 100 from overheating due to heat generated therefrom.

The first heat dissipation fins 610 are formed to protrude in a downward direction of the first heat dissipation member 600. The first heat dissipation fins 610 may be provided in plural. The first heat dissipation fins 610 may function to effectively transfer, to the outside of the device, heat transferred from the light source unit 100 to the first heat dissipation member 600.

The first heat dissipation member 600 may be made of a material exhibiting excellent workability in order to exhibit excellent thermal conductivity and to realize a complicated shape. In this regard, it is suitable for the first heat dissipation member 600 to be made of metal. For example, the first heat dissipation member 600 may be made of a material such as copper, a copper alloy, aluminum, or an aluminum alloy exhibiting excellent thermal conductivity and excellent workability.

The casing 700 may have a hollow structure in order to receive the first light transfer member 200, the light diffusion member 500 and the second light transfer member 300. The casing 700 may include a second heat dissipation member 710.

The second heat dissipation member 710 is formed at a side portion of the casing 700. The second heat dissipation member 710 dissipates heat generated in the casing 700 to the outside of the casing 700 and, as such, it may be possible to inhibit the first light transfer member 200, the light diffusion member 500 and the second light transfer member 300 from overheating.

The second heat dissipation member 710 may include a second heat dissipation fin 711. For example, as illustrated in FIG. 9, the second heat dissipation fin 711 may have a structure including a protruding lattice having horizontal bars and vertical bars crossing each other, and protrusions formed at crossing points of the lattice.

However, the second heat dissipation fin 711 is not limited to the above-described structure, and may have any structure, so long as the structure achieves effective heat transfer to the outside thereof.

The second heat transfer fin 711 may function to achieve effective heat transfer from the casing 700 to the outside thereof. Similarly to the first heat dissipation member 600, the second heat dissipation fin 711 may be made of a material such as copper, a copper alloy, aluminum, or an aluminum alloy exhibiting excellent thermal conductivity and excellent workability.

Figure 11:
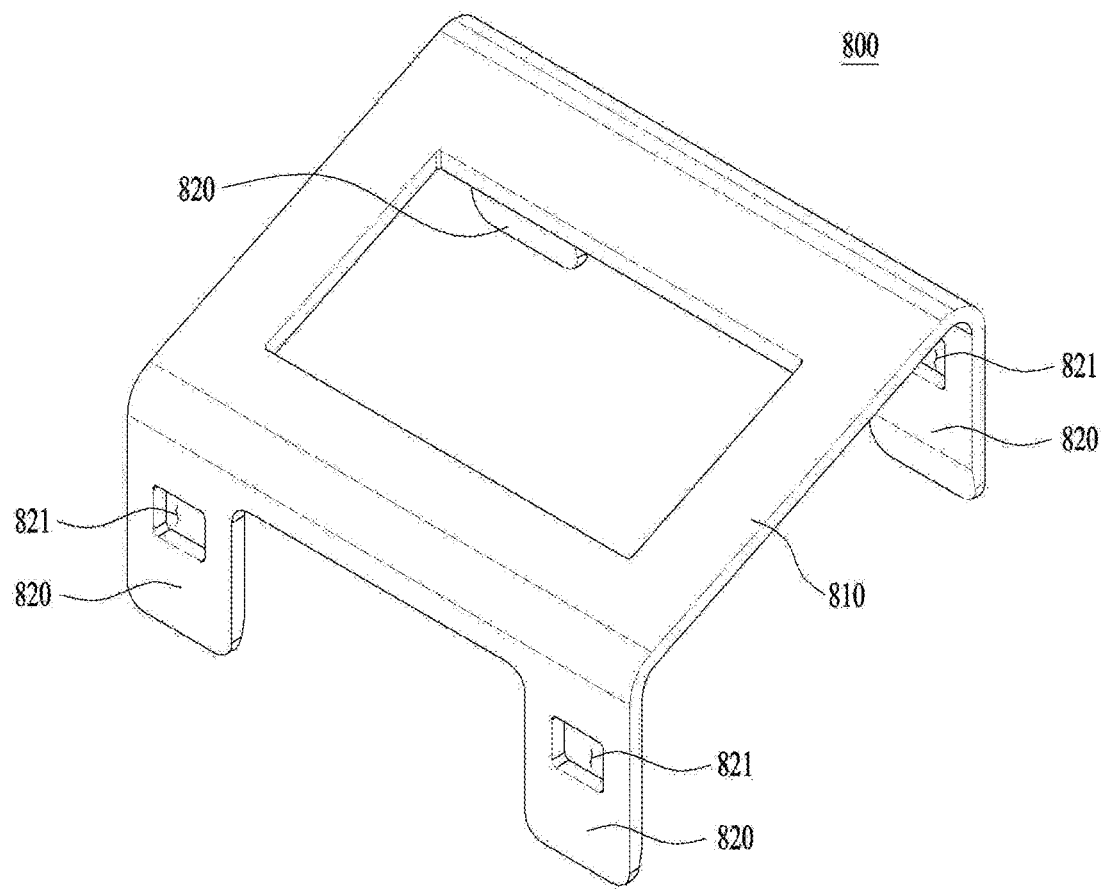
FIG. 11 is a perspective view illustrating a holder of the embodiment.
Figure 12:
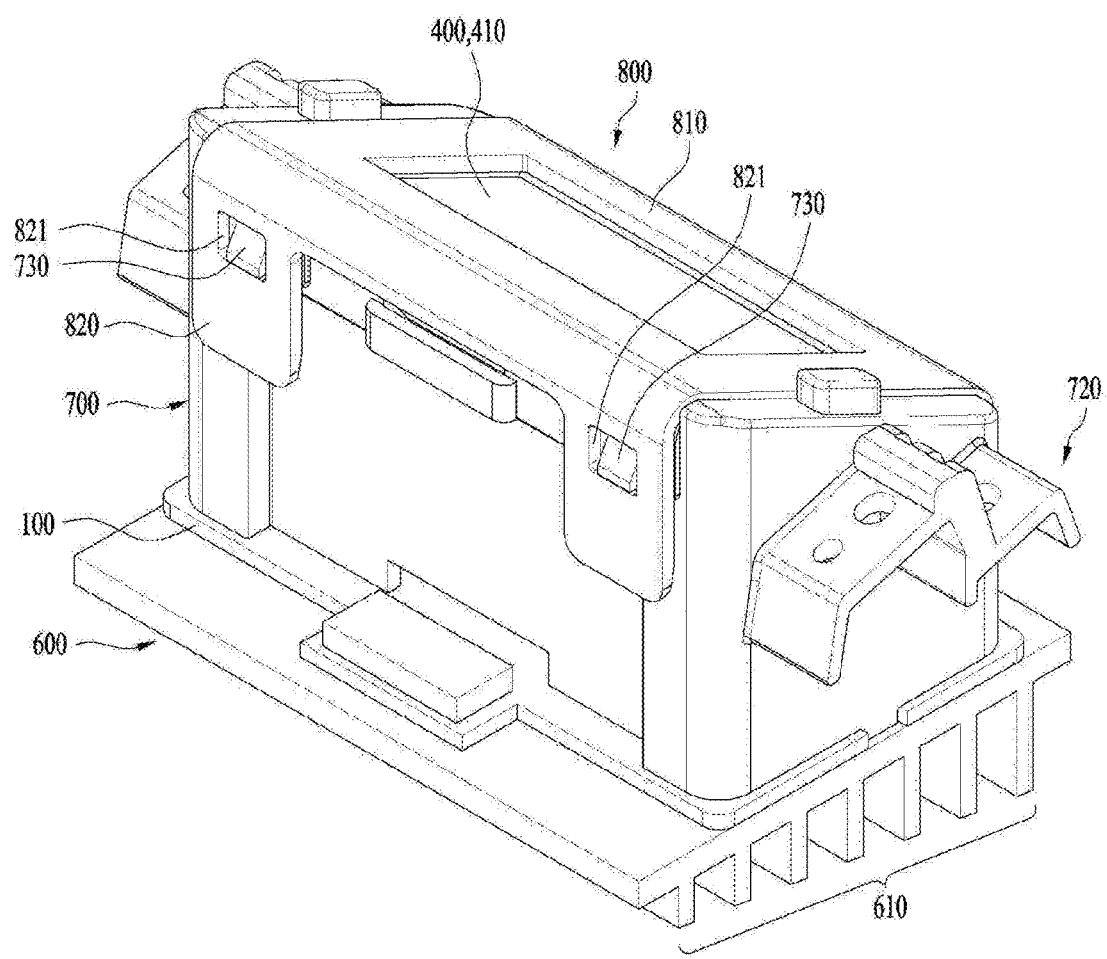
FIG. 12 is a back-side perspective view corresponding to FIG. 9.

FIG. 11 is a perspective view illustrating the holder 800 of the embodiment. FIG. 12 is a back-side perspective view corresponding to FIG. 9. As illustrated in FIG. 11, the head up display device may further include the holder 800.

The holder 800 is detachably coupled to the casing 700. The holder 800 may function to couple the display unit 400 to the casing 700. The holder 800 may include a first mounting section 810 and second mounting sections 820.

The first mounting section 810 is formed with an opening at a portion thereof corresponding to the image panel 410 of the display unit 400. It may be possible to mount the holder 800 to the casing 700 by pressing the display unit 400. The second mounting sections 820 extend from the first mounting section 810 in a bent state. The second mounting sections 820 are coupled to the casing 700 and, as such, the holder 800 may be mounted to the casing 700.

In order to enable the holder 800 to be detachably coupled to the casing 700, the holder 800 may be provided with second through holes 821, and the casing 700 may be provided with hooks 730.

The second through holes 821 may be provided at the second mounting sections 820. In this case, it may be suitable for at least four second mounting sections 820 to be provided, as illustrated in FIG. 11, in order to stably mount the display unit 400 to the casing 700. In this case, at least one second through hole 821 may be provided at each second mounting section 820.

The hooks 730 are formed at side portions of the casing 700 to protrude from the side portions of the casing 700. The second through holes 821, which are formed at the second mounting sections 820, may receive the hooks 730, respectively. In this case, the second mounting sections 820 have elasticity and, as such, the holder 800 may be easily detachably coupled to the casing 700.

In accordance with the above-described structures, it may be possible to easily mount or separate the display unit 400 to or from the casing 700, using the holder 800, without using thread fastening.

Meanwhile, it may be possible to adjust pressing force applied to the display unit 400 by the holder 800 by adjusting the size of the second through holes 821, the positions of the second through holes 821 at the second mounting sections 820, etc. It may be possible to firmly couple the display unit 400 to the casing 700 by increasing the pressing force.

Figure 13:
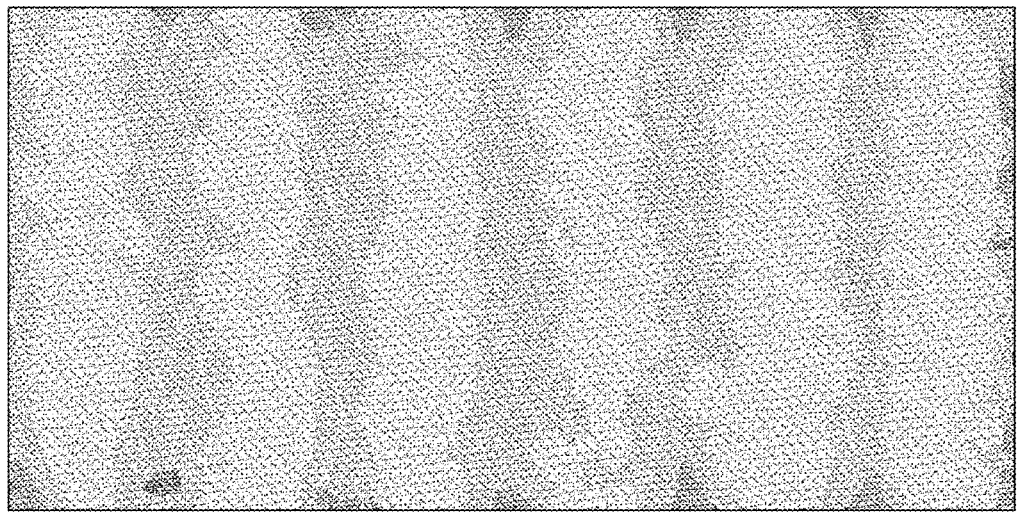
FIG. 13 illustrates an image displayed on a display unit in a head up display device having a configuration in which a light diffusion member is disposed between a first light transfer member and a second light transfer member while being parallel to an x-y plane perpendicular to an optical axis direction.

FIG. 13 illustrates an image displayed on the display unit 400 in a head up display device having a configuration in which the light diffusion member 500 is disposed between the first light transfer member 200 and the second light transfer member 300 while being parallel to the x-y plane perpendicular to the optical axis direction.

Figure 14:
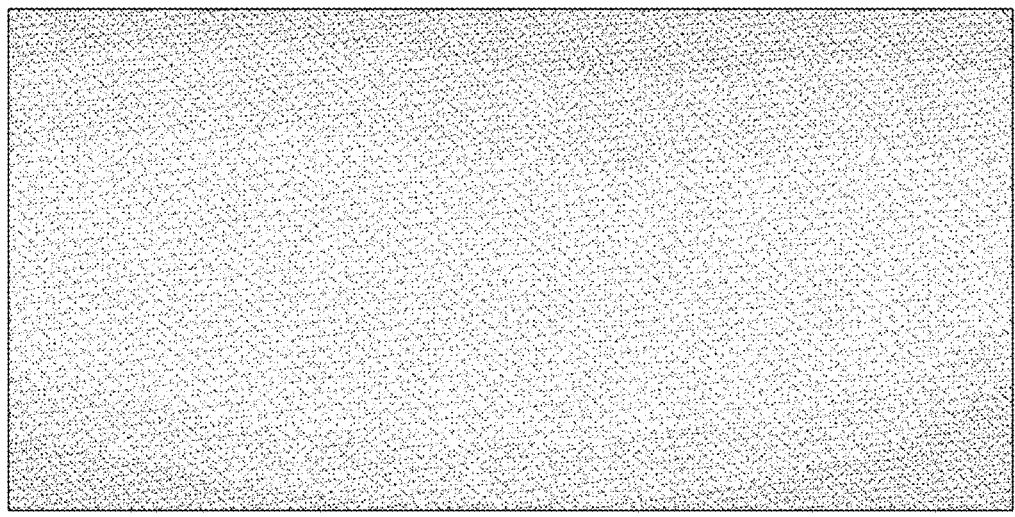
FIG. 14 illustrates an image disposed on a display unit in the head up display device of the embodiment in which the light diffusion member is disposed between the second light transfer member and the display unit while being inclined with respect to an optical axis direction.

FIG. 14 illustrates an image disposed on the display unit 400 in the head up display device of the embodiment in which the light diffusion member 500 is disposed between the second light transfer member 300 and the display unit 400 while being inclined with respect to the optical axis direction.

The images of FIGS. 13 and 14 are images obtained through simulation. FIG. 13 shows an image obtained in the head up display device compared to the head up display device of the embodiment. FIG. 14 shows an image obtained in the head up display device of the embodiment.

After comparison of FIGS. 13 and 14 with each other, it can be seen that the image obtained in the head up display device of the present invention exhibits enhanced uniformity, as compared to that of the comparative head up display device.

In addition, in the case of the image in FIG. 13, irregular patterns are exhibited in the form of repeated patterns in the entirety of the image and, as such, it can be clearly seen that image uniformity is low.

On the other hand, in the case of the image in FIG. 14, irregular patterns remarkably reduced in number are exhibited, as compared to the case of FIG. 13 and, as such, it can be clearly seen that image uniformity is remarkably high, as compared to the case of FIG. 13.

After comparison of FIGS. 13 and 14 with each other, it can be seen that the image displayed on the display unit 400 in the head up display device of the embodiment exhibits remarkably enhanced uniformity. Such uniformity enhancement proves an enhancement in light diffusion effects of the light diffusion member 500 in the head up display device of the embodiment.

Figure 15:
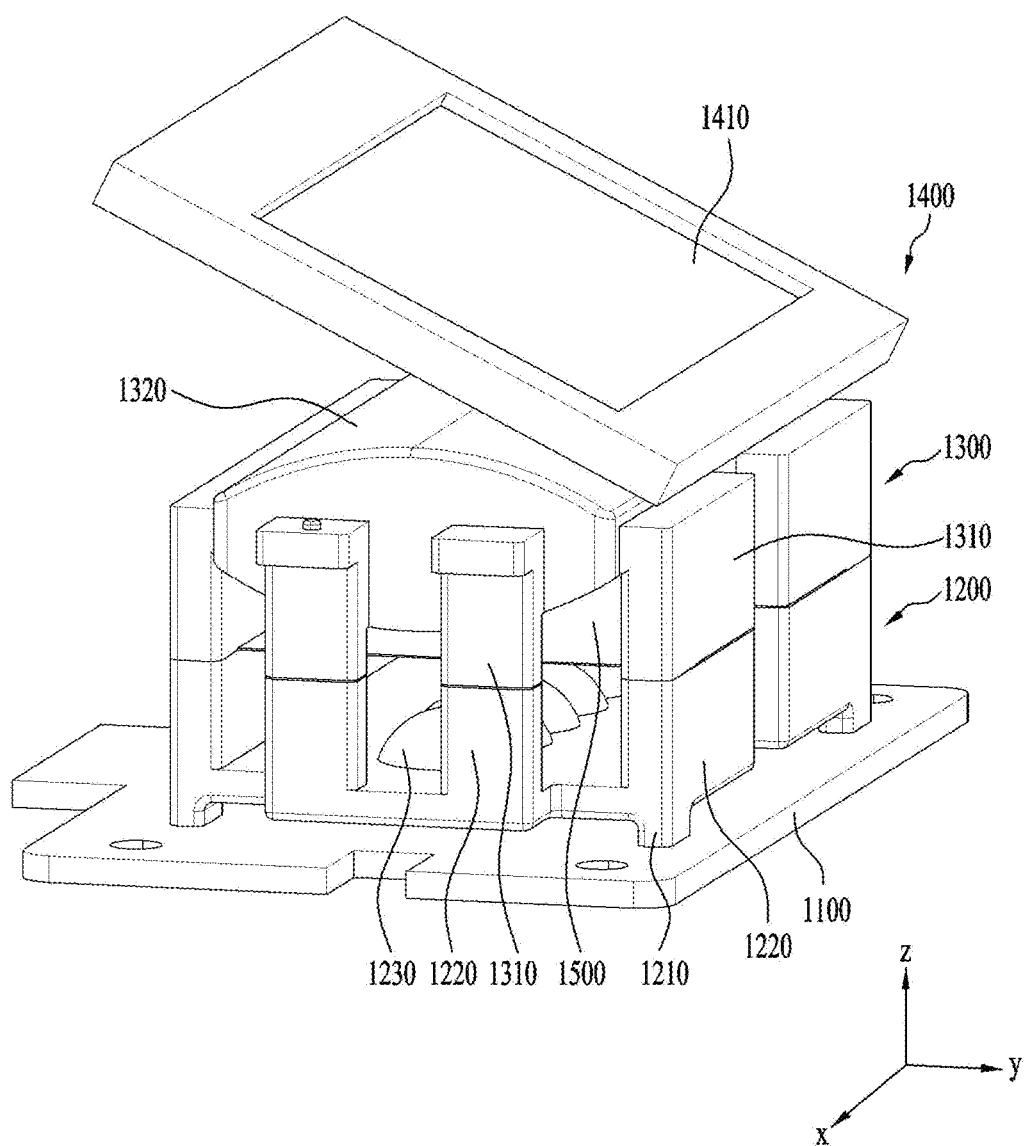
FIG. 15 is a perspective view illustrating a head up display device according to another embodiment.
Figure 16:
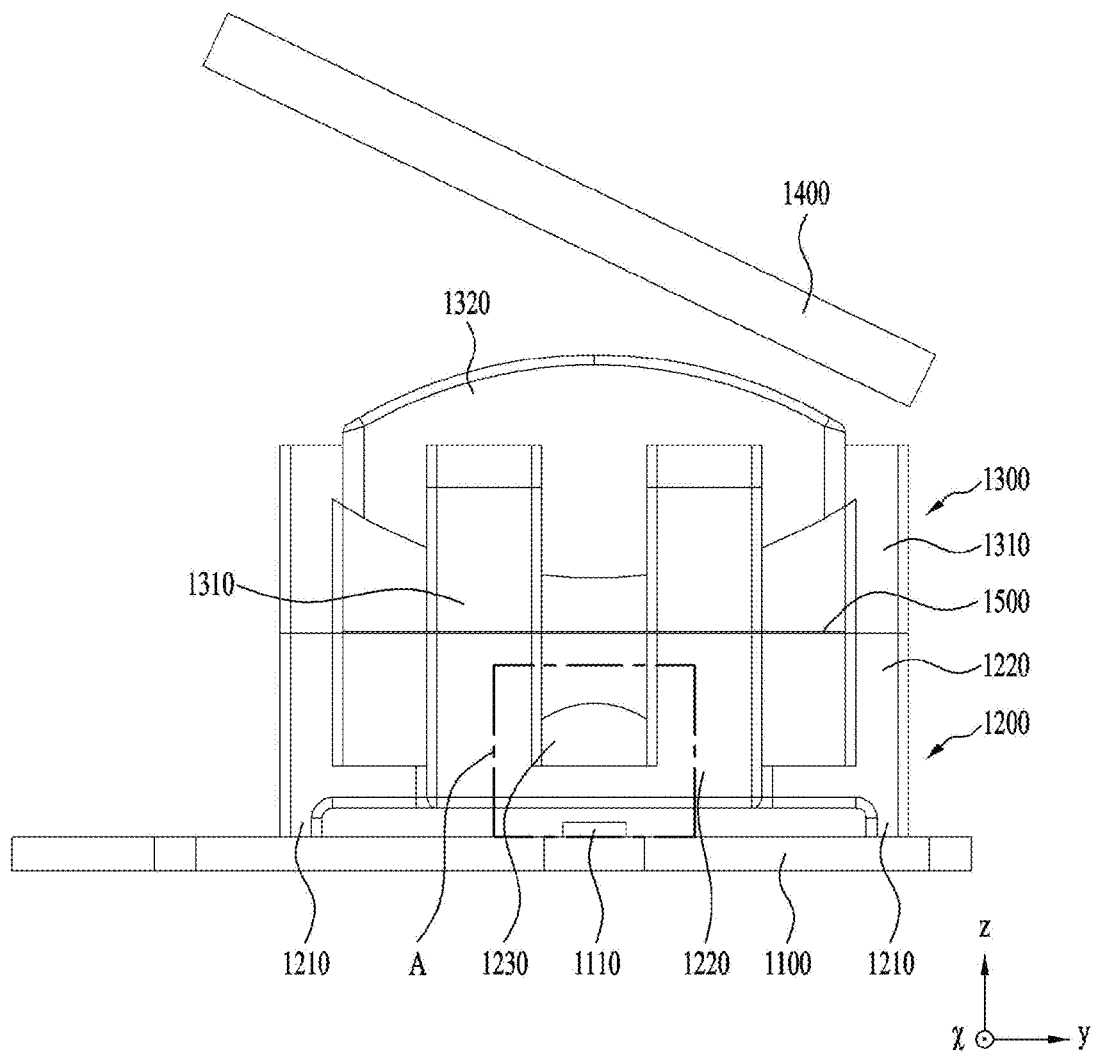
FIG. 16 is a side view corresponding to FIG. 15.

FIG. 15 is a perspective view illustrating a head up display device according to another embodiment. FIG. 16 is a side view corresponding to FIG. 15. The display device of the embodiment may include a light source unit 1100, a first light transfer member 1200, a second light transfer member 1300, a display unit 1400, and a light diffusion unit 1500.

The light source unit 1100 functions to emit light. Light emitted from the light source unit 1100 may be incident upon the display unit 1400 after passing through the first light transfer member 1200, the light diffusion member 1500 and the second light transfer member 1300.

In this case, an image displayed on the display unit 1400 is carried by light emitted from the light source unit 1100, and is then projected onto a windshield of a vehicle or the like, and, as such, a passenger of the vehicle may view the image projected onto the windshield.

The light source unit 1100 may be provided with a light emitting element 1100 for emitting light. For the light emitting element 1100, a product having high brightness and low energy consumption may be suitable. For the light emitting element 1100, for example, a light emitting diode (LED) or the like may be used.

The light source unit 1100 may be manufactured in the form of, for example, a printed circuit board. In this case, accordingly, the light source unit 1100 may be configured by mounting, on a printed circuit board, at least one light emitting element 1110, and a positive or passive element and a circuit line, which are needed for supply of electric power to the light emitting element 1110.

The display unit 1400 is disposed to face the second light transfer member 1300 in a first direction and, as such, light passing through the second light transfer member 1300 may be incident upon the display unit 1400. The display unit 1400 may include an image panel 1410 for reproducing an image.

In this case, the image panel 1410 may be embodied as a liquid crystal display (LCD), a plasma display panel (PDP), an organic light emitting diode (OLED) or the like.

The display unit 1400 may reproduce an image. When it is desired to enable the passenger to clearly view an image from the display unit 1400 projected onto the windshield of the vehicle with the naked eye, additional projection light is needed.

In connection with this, light emitted from the light source unit 1100 may function as projection light as described above. Accordingly, an image displayed on the display unit 1400 is projected onto the windshield of the vehicle while being carried by the light emitted from the light source unit 1100 and, as such, the passenger of the vehicle may view the image projected onto the windshield.

Meanwhile, when it is desired to adjust a projection angle of the image projected from the display unit 1400, adjustment of the image projection angle may be achieved, for example, by arranging a prism, a mirror or the like at a suitable position between the display unit 1400 and the windshield.

The first light transfer member 1200 is disposed to face the light source unit 1100 in an optical axis direction, that is, the first direction, and, as such, light emitted from the light source unit 1100 may pass through the first light transfer member 1200. In this case, the first light transfer member 1200 may function to diffuse light incident from the light source unit 1100 over a plane perpendicular to the first direction.

Light emitted from the light emitting element 1110 may have a smaller area in a plane perpendicular to the first direction than the area of the image panel 1410. In connection with this, the first light transfer member 1200 may diffuse light emitted from the light emitting element 1110.

To this end, the first light transfer member 1200 may include a convex lens section 1230. Through the convex lens section 1230, light incident from the light source unit 1100 may pass. That is, light incident from the light emitting element 1110 upon the first light transfer member 1200 may concentrate on the convex lens section 1230.

Accordingly, the convex lens section 1230 may be disposed at a position corresponding, in the first direction, to a position where the light emitting element 1110 is disposed.

Referring to FIG. 15, the light emitting element 1110 is disposed in plural in a second direction perpendicular to the first direction, that is, an x-axis direction in FIG. 15. The convex lens section 1230 may include a plurality of convex lenses disposed at positions corresponding, in the first direction, to the light emitting elements 1110, respectively. In this case, the convex lenses may be disposed in plural in the second direction identical to the arrangement direction of the light emitting elements 1110.

In accordance with the above-described configuration, light emitted from the plurality of light emitting elements 1110 may be refracted by the convex lenses while passing through the convex lens section 1230 and, as such, may be diffused.

The second light transfer member 1300 may be disposed to face the first light transfer member 1200 in the first direction. Through the second light transfer member 1300, light emerging from the first light transfer member 1200 may pass.

Meanwhile, light emerging from the first light transfer member 1200 may be incident upon the second light transfer member 1300 after passing through the light diffusion member 1500, which may be selectively provided at the head up display device of the embodiment, as will be described later.

The second light transfer member 1300 causes light incident thereupon to have a shape corresponding to the shape and area of the image panel 1410. The second light transfer member 1300 also causes, together with the light diffusion member 1500, the light to be distributed in a plane parallel to the display unit 1400 while having uniform brightness.

In order to accomplish such purposes, the second light transfer member 1300 may include a light transmitting portion (1320) formed to have a curved shape having an upwardly convex upper surface and a downwardly convex lower surface while allowing light to pass therethrough.

In accordance with the curved shape of the light transmitting portion 1320, light emerging from the light transmitting portion 1320 may have uniform brightness in a plane parallel to the display unit 1400 while having a shape corresponding to the shape and area of the image panel 1410.

For example, the light transmitting portion 1320 may produce light having a shape and an area, which correspond to those of the image panel 1410, by adjusting an angle of light incident thereupon with respect to the first direction of the light. To this end, the light transmitting portion 1320 may be formed to have a curved shape having an upwardly convex upper surface and a downwardly convex lower surface, in order to adjust the angle of the incident light with respect to the first direction of the incident light.

The light diffusion member 1500 may be disposed between the first light transfer member 1200 and the second light transfer member 1300. In this case, the light diffusion member 1500 may have, for example, a film structure. Light emerging from the first light transfer member 1200 may be incident upon the second light transfer member 1300 after passing through the light diffusion member 1500.

The light diffusion member 1500 may function to diffuse light emerging from the first light transfer member 1200 over a plane perpendicular to an optical axis while causing the light to have uniform brightness. Light emerging from the first light transfer member 1200 may exhibit brightness non-uniformly distributed in a plane perpendicular to the optical axis when viewed in the plane.

For example, the light in the plane may exhibit high brightness at a position corresponding to the convex lens section 1230 provided at the first light transfer member 1200, but may exhibit gradually reduced brightness at a position gradually farther from the position corresponding to the convex lens section 1230.

In this case, the light diffusion member 1500 may uniformize the intensity of illumination of light in the above-described plane in accordance with a method of reducing light transmissivity at the position corresponding to the convex lens section 1230 while increasing light transmissivity at other positions.

Of course, the structure of the light diffusion member 1500 is only illustrative. The light diffusion member 1500 may cause light incident from the first light transfer member 1200 to have uniform brightness in the above-described plane.

Figure 17:
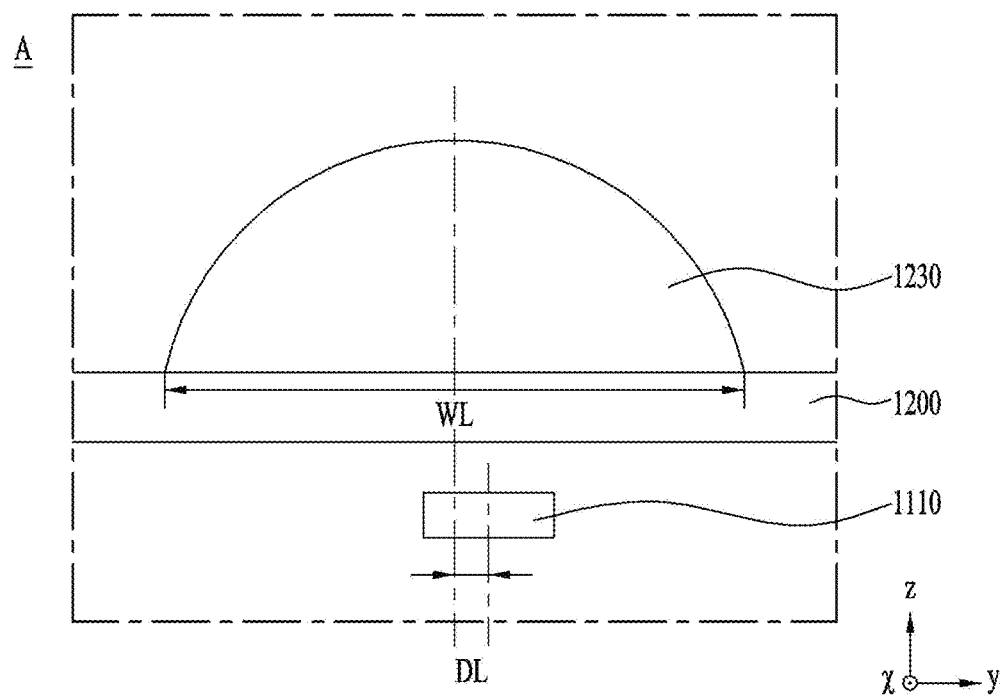
FIG. 17 is a schematic enlarged view corresponding to a portion A of FIG. 16.

FIG. 17 is a schematic enlarged view corresponding to a portion A of FIG. 16. As illustrated in FIG. 17, the center of the light emitting element 1110 may be spaced apart from the center of the convex lens section 1230 in a direction perpendicular to the first direction.

Referring to FIG. 17, for example, the center of the light emitting element 1110 may be spaced apart from the center of the convex lens section 1230 in a third direction perpendicular to the first direction and the second direction.

Meanwhile, again referring to FIG. 16, the display unit 1400 may be disposed to be inclined with respect to the first direction. Generally, an image provided to the passenger of the vehicle after being reproduced from the display unit 1400 is projected onto the windshield of the vehicle and, as such, the passenger views the image projected onto the windshield, that is, a virtual image.

In this case, since the windshield of the vehicle is generally disposed to be inclined with respect to the ground surface, it is necessary to adjust the angle, at which light carrying an image emitted from the display unit 1400 is projected, in order to enable the image from the display unit 1400 to be projected onto the windshield without being distorted.

To this end, the display unit 1400 is disposed to be inclined with respect to the first direction and, as such, the angle, at which light carrying an image emitted from the display unit 1400 is projected, may be appropriately adjusted.

Referring to FIGS. 16 and 17, the center of the light emitting element 1110 may be disposed in a region near the display unit 1400 in the first direction while being spaced apart from the center of the convex lens section 1230 in a direction perpendicular to the first direction. That is, as illustrated in FIGS. 16 and 17, the center of the light emitting element 1110 may be disposed at a position spaced apart from the center of the convex lens section 1230 in a plus (+) y axis direction.

In this configuration, light emerging from the second light transfer member 1300 may be distributed in a greater quantity in a region disposed at an outer side of the center of the convex lens section 1230 in FIG. 16, that is, a region far from the display unit 1400 in the first direction.

In a configuration in which the display unit 1400 is inclinedly disposed, and the center of the convex lens coincides with the center of the light emitting element 1110, light emerging from the second light transfer member 1300 is distributed in a region near the display unit 1400 in the first direction in a greater quantity than in a region far from the display unit 1400 in the first direction. Such a phenomenon may cause degradation in light uniformity in the display unit 1400.

To this end, in the embodiment, the center of the light emitting element 1110 is disposed at a position spaced apart from the center of the convex lens section 1230 in the plus (+) y axis direction and, as such, light emerging from the second light transfer member 1300 may be distributed in the region far from the display unit 1400 in the first direction in a greater quantity. Accordingly, light uniformity in the display unit 1400 may be enhanced.

Meanwhile, as illustrated in FIG. 17, it may be suitable for the light emitting element 1110 to overlap with the convex lens section 1230 in the first direction. In accordance with this arrangement, it may be possible to inhibit the light emitting element 1110 from being excessively spaced apart from the convex lens section 1230 in the second direction or the third direction, thereby avoiding a phenomenon in which a part of light emitted from the light emitting element 1110 cannot be incident upon the convex lens section 1230, and, as such, degradation in light uniformity in the display unit 1400 may be avoided.

Meanwhile, the distance, DL, between the center of the light emitting element 1110 and the center of the convex lens section 1230 may be ¼ or less of the width, WL, of the convex lens section 1230 in the third direction. Of course, the distance DL is not zero.

In the embodiment, the center of the light emitting element 1110 is spaced apart from the center of the convex lens section 1230 in a direction perpendicular to the first direction, which is the optical axis direction and, as such, light uniformity in the display unit 1400 may be enhanced.

Figure 18:
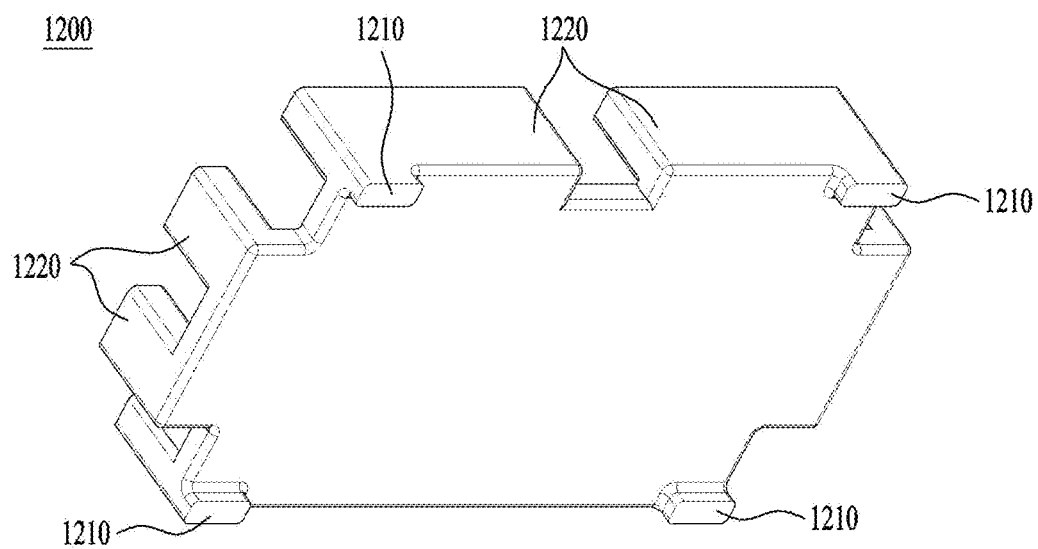
FIG. 18 is a bottom-side perspective view illustrating a first light transfer member in the embodiment.
Figure 19:
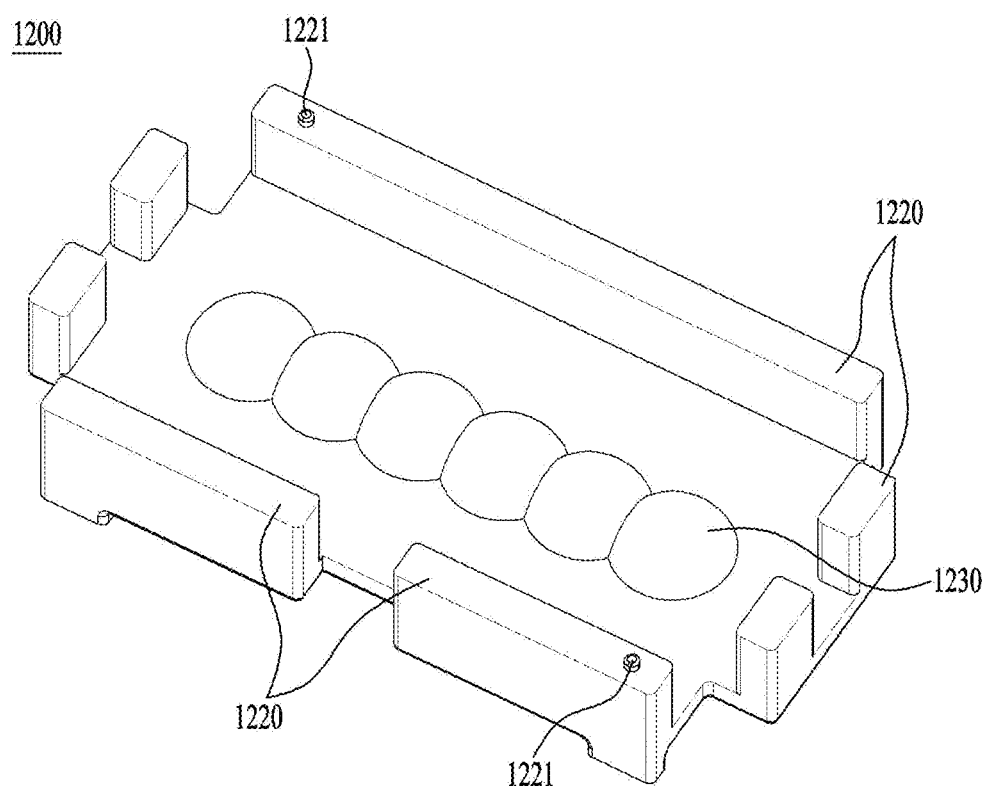
FIG. 19 is a perspective view of the first light transfer member viewed from the top side.

FIG. 18 is a bottom-side perspective view illustrating the first light transfer member 1200 in the embodiment. FIG. 19 is a perspective view of the first light transfer member 1200 viewed from the top side. As illustrated in FIGS. 18 and 19, the first light transfer member 1200 may be provided with first flanges 1210 and second flanges 1220.

The first flanges 1210 may be formed at a lower surface of the first light transfer member 1200 to protrude downwards from the lower surface of the first light transfer member 1200. The first flanges 1210 may function to space the light source unit 1100 and the first light transfer member 1200 from each other in the first direction.

In accordance with the distance in the first direction between the light source unit 1100 and the first light transfer member 1200, the shape of light passing through the first light transfer member 1200, the brightness distribution, that is, uniformity, of the light in a plane perpendicular to the first direction, and other characteristics of the light may be varied.

Accordingly, in the embodiment, the first flanges 1210 are employed to adjust the distance in the first direction between the light source unit 1100 and the first light transfer member 1200 and, as such, it may be possible to obtain an optimal light shape and optimal light uniformity.

That is, it may be possible to set the distance in the first direction between the light source unit 1100 and the first light transfer member 1200 capable of optimizing the shape, uniformity, etc. of light passing through the first light transfer member 1200 by appropriately adjusting the length of each first flange 1210 in the first direction.

The length of each first flange 1210 in the first direction may be varied in accordance with the size, concrete configuration, etc. of the head up display device. In this regard, the length of each first flange 1210 in the first direction may be variously set in accordance with head up display devices having various sizes and various structures.

In addition, the number of the first flanges 1210 and the formation position and shape of each first flange 1210 may be variously selected in accordance with the size and concrete configuration of the head up display device.

The second flanges 1220 may be formed at an upper surface of the first light transfer member 1200 to protrude upwards from the upper surface of the first light transfer member 1200. The second flanges 1220 may function to space the first light transfer member 1200 and the second light transfer member 1300 from each other in the first direction.

In accordance with the distance in the first direction between the first light transfer member 1200 and the second light transfer member 1300, the shape of light passing through the second light transfer member 1300, the uniformity of the light, and other characteristics of the light may be varied.

Accordingly, in the embodiment, the second flanges 1220 are employed to adjust the distance in the first direction between the first light transfer member 1200 and the second light transfer member 1300 and, as such, it may be possible to obtain an optimal light shape and optimal light uniformity.

That is, it may be possible to set the distance in the first direction between the first light transfer member 1200 and the second light transfer member 1300 capable of optimizing the shape, uniformity, etc. of light passing through the second light transfer member 1300 by appropriately adjusting the length of each second flange 1220 in the first direction.

The length of each second flange 1220 in the first direction may be varied in accordance with the size, concrete configuration, etc. of the head up display device. In this regard, the length of each second flange 1220 in the first direction may be variously set in accordance with head up display devices having various sizes and various structures.

In addition, the number of the second flanges 1220 and the formation position and shape of each second flange 1220 may be variously selected in accordance with the size and concrete configuration of the head up display device.

Figure 20:
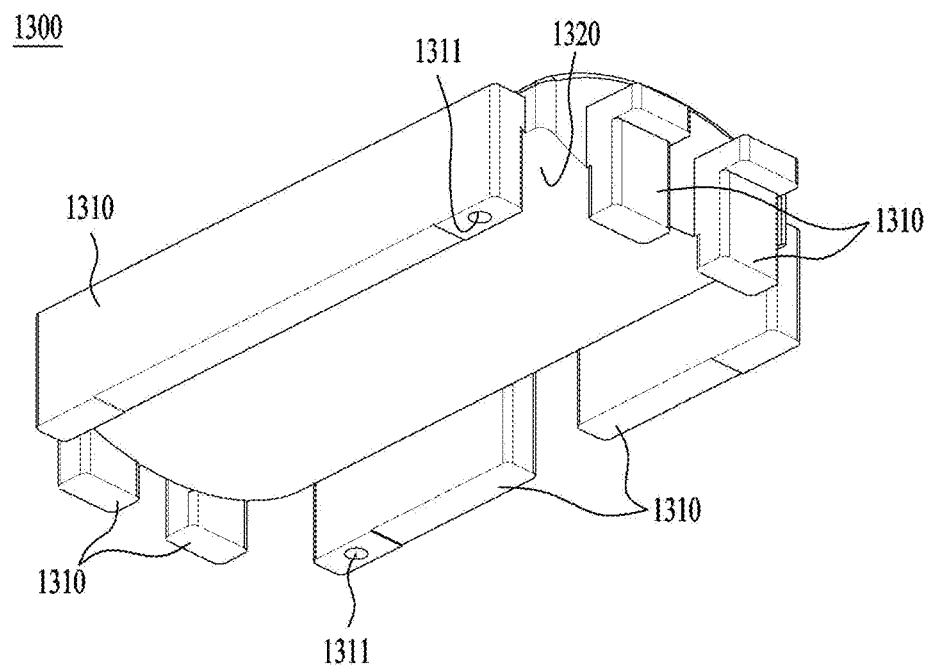
FIG. 20 is a bottom-side perspective view illustrating a second light transfer member in the embodiment.

FIG. 20 is a bottom-side perspective view illustrating the second light transfer member 1300 in the embodiment. As illustrated in FIG. 20, the second light transfer member 1300 may include third flanges 1310.

The third flanges 1310 may be formed at side surfaces of the light transmitting portion 1320. The third flanges 1310 may be formed to protrude downwards of the second light transfer member 1300 while corresponding to the second flanges 1220, respectively. Similarly to the second flanges 1220, the third flanges 1310 may function to space the first light transfer member 1200 and the second light transfer member 1300 from each other in the first direction. In the following description, description of the third flanges 1310 overlapping with that of the second flanges 1220 will be omitted.

It may be possible to set the distance in the first direction between the first light transfer member 1200 and the second light transfer member 1300 capable of optimizing the shape, uniformity, etc. of light passing through the second light transfer member 1300 by appropriately adjusting the lengths of each second flange 1220 and each third flange 1310 in the first direction.

Meanwhile, the light diffusion member 1500 may be disposed between the second flanges 1220 and the third flanges 1310. For example, as illustrated in FIG. 16, the light diffusion member 1500 may be disposed between upper surfaces of the second flanges 1220 and lower surfaces of the third flanges 1310.

It may be possible to optimize the shape, uniformity, etc. of light passing through the second light transfer member 1300 by appropriately adjusting the position of the light diffusion member 1500 in the first direction, that is, the distance in the first direction between the light diffusion member 1500 and the first light transfer member 1200 and the distance in the first direction between the light diffusion member 1500 and the second light transfer member 1300.

The position of the light diffusion member 1500 in the first direction may be adjusted by appropriately setting the length of each second flange 1220 in the first direction, the length of each third flange 1310 in the first direction, and the ratio between the flange lengths in the first direction.

In the embodiment, it may be possible to optimize the shape, uniformity, etc. of light passing through the first light transfer member 1200 and the second light transfer member 1300 after being emitted from the light source unit 1100 by appropriately adjusting the lengths of each first flange 1210, each second flange 1220 and each third flange 1310 in the first direction.

Meanwhile, the first light transfer member 1200, the light diffusion member 1500 and the second light transfer member 1300 may be made of a light transmissive material. In addition, the image panel 1410 may be formed using a light transmissive material and a light transmissive structure allowing light emerging from the second light transfer member 1300 to pass therethrough.

As illustrated in FIGS. 19 and 20, the first light transfer member 1200 may include first protrusions 1221, and the second light transfer member 1300 may include first grooves 1311.

That is, the first protrusions 1221 may be formed at upper surfaces of the second flanges 1220, respectively. The first grooves 1311 may be formed at lower surfaces of the third flanges 1310 at positions corresponding to the first protrusions 1221 such that the first protrusions 1221 are inserted into the first grooves 1311, respectively.

It is suitable for the first light transfer member 1200 and the second light transfer member 1300 to be disposed at designed positions in a plane perpendicular to the first direction, that is, an x-y plane, respectively. When the first light transfer member 1200 and the second light transfer member 1300 escape from the designed positions thereof in the x-y plane beyond an allowable range, the shape, uniformity, etc. of light passing through the second light transfer member 1300 may differ from the previously set shape, uniformity, etc. As a result, the quality of the image projected onto the windshield of the vehicle may be degraded.

In the embodiment, the first protrusions 1221 are inserted into the first grooves 1311, respectively, and, as such, the first light transfer member 1200 and the second light transfer member 1300 may be disposed at designed positions thereof in the x-y plane, respectively. Accordingly, it may be possible to inhibit the first light transfer member 1200 and the second light transfer member 1300 from escaping from the designed positions thereof in the x-y plane beyond an allowable range.

The first protrusions 1221 may be provided in a suitable number so as to be disposed at appropriate positions on the upper surfaces of the second flanges 1220, respectively. The first grooves 1311 may be provided in the same number as the first protrusions 1221 so as to be disposed at positions corresponding to the first protrusions 1221 in the first direction on the lower surfaces of the third flanges 1310, respectively.

In another embodiment, the first protrusions 1221 and the first grooves 1311 may be interchanged in position in the first direction. That is, the first protrusions 1221 may be formed at the lower surfaces of the third flanges 1310, and the first grooves 1311, into which the first protrusions 1221 are inserted, may be formed at the upper surfaces of the second flanges 1220 at positions corresponding to the first protrusions 1221, respectively.

Figure 21:
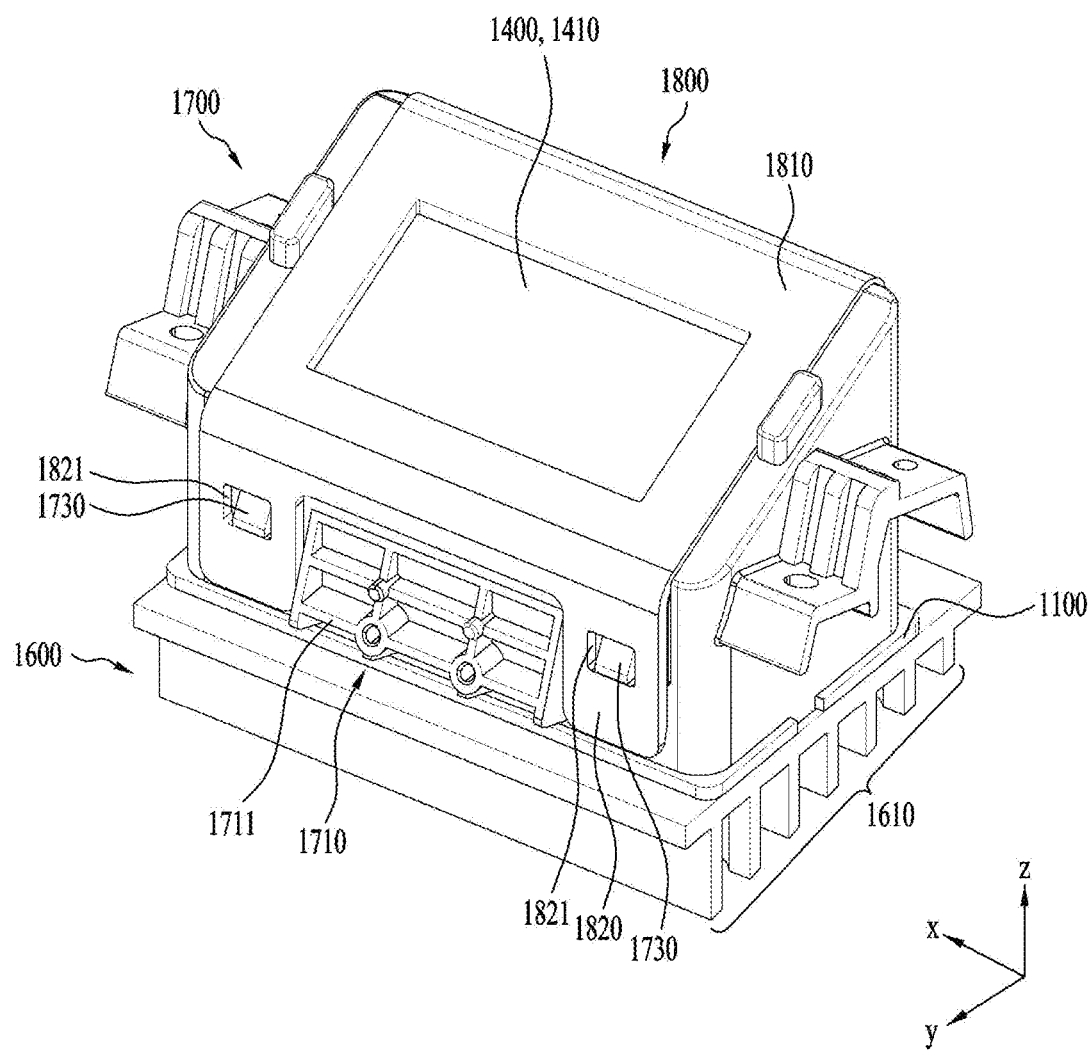
FIG. 21 is a perspective view illustrating coupled states of a first heat dissipation member, a casing and a holder to the embodiment of FIG. 15.
Figure 22:
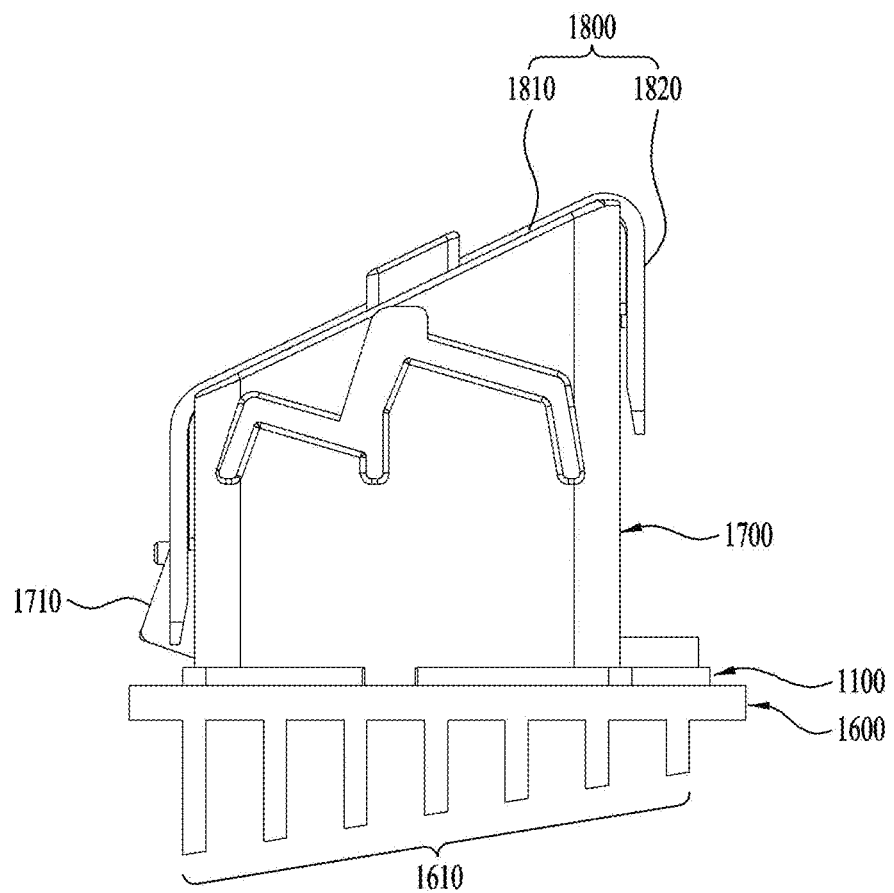
FIG. 22 is a side view corresponding to FIG. 21.

FIG. 21 is a perspective view illustrating coupled states of a first heat dissipation member 1600, a casing 1700 and a holder 1800 to the embodiment of FIG. 15. FIG. 22 is a side view corresponding to FIG. 21. The head up display device of the embodiment may further include the first heat dissipation member 1600, the casing 1700, and the holder 1800.

The first heat dissipation member 1600 may be coupled to the light source unit 1100, to be disposed beneath the light source unit 1100. The first heat dissipation member 1600 may include a plurality of first heat dissipation fins 1610. The first heat dissipation member 1600 may be provided to dissipate heat generated from the light source unit 1100.

Heat may be generated from the light source unit 1100 during light emission thereof. Accordingly, it is necessary to inhibit the light source unit 1100 from overheating due to heat generated therefrom.

The first heat dissipation fins 1610 are formed to protrude in a downward direction of the first heat dissipation member 1600. The first heat dissipation fins 1610 may be provided in plural. The first heat dissipation fins 1610 may function to effectively transfer, to the outside of the device, heat transferred from the light source unit 1100 to the first heat dissipation member 1600.

The first heat dissipation member 1600 may be made of a material exhibiting excellent workability in order to exhibit excellent thermal conductivity and to realize a complicated shape. In this regard, it is suitable for the first heat dissipation member 1600 to be made of metal. For example, the first heat dissipation member 1600 may be made of a material such as copper, a copper alloy, aluminum, or an aluminum alloy exhibiting excellent thermal conductivity and excellent workability.

The casing 1700 may have a hollow structure in order to receive the first light transfer member 1200, the light diffusion member 1500 and the second light transfer member 1300. The casing 1700 may include a second heat dissipation member 1710.

The second heat dissipation member 1710 is formed at a side portion of the casing 1700. The second heat dissipation member 1710 dissipates heat generated in the casing 1700 to the outside of the casing 1700 and, as such, it may be possible to inhibit the first light transfer member 1200, the light diffusion member 1500 and the second light transfer member 1300 from overheating.

The second heat dissipation member 1710 may include a second heat dissipation fin 1711. For example, as illustrated in FIG. 20, the second heat dissipation fin 1711 may have a structure including a protruding lattice having horizontal bars and vertical bars crossing each other, and protrusions formed at crossing points of the lattice.

However, the second heat dissipation fin 1711 is not limited to the above-described structure, and may have any structure, so long as the structure achieves effective heat transfer to the outside thereof.

The second heat transfer fin 1711 may function to achieve effective heat transfer from the casing 1700 to the outside thereof. Similarly to the first heat dissipation member 1600, the second heat dissipation fin 1711 may be made of a material such as copper, a copper alloy, aluminum, or an aluminum alloy exhibiting excellent thermal conductivity and excellent workability.

Figure 23:
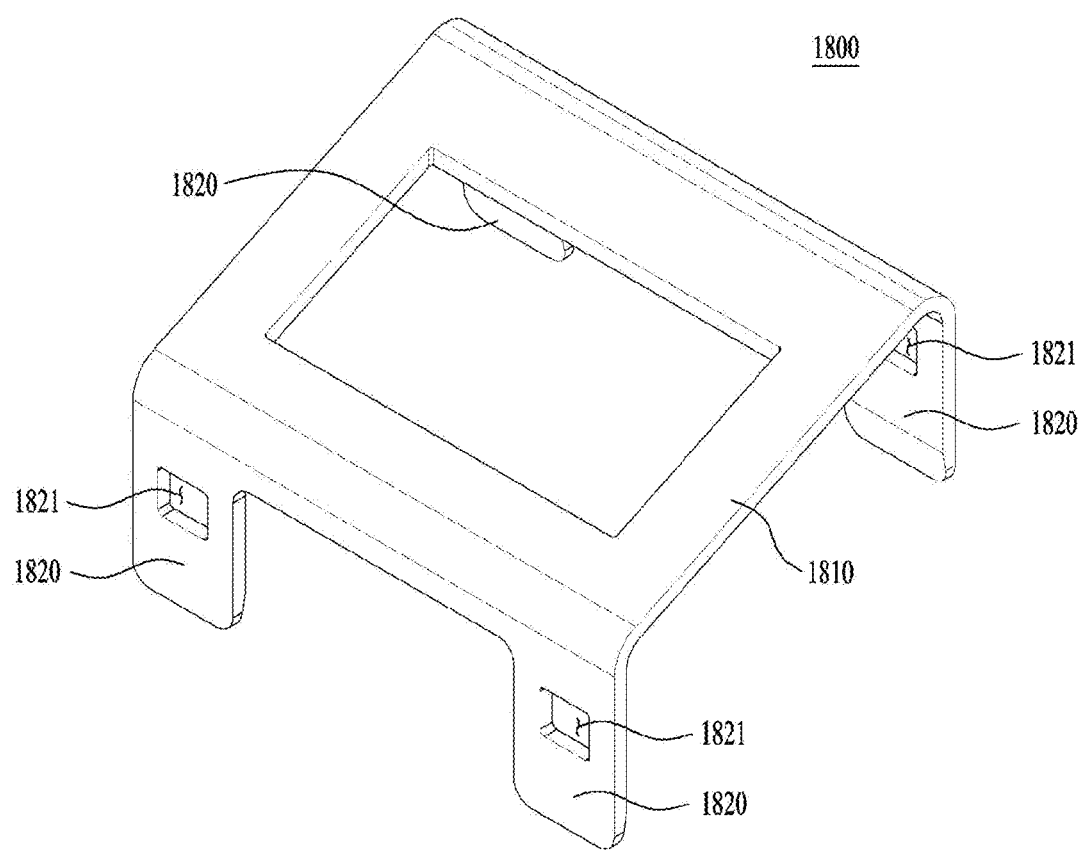
FIG. 23 is a perspective view illustrating the holder of the embodiment.
Figure 24:
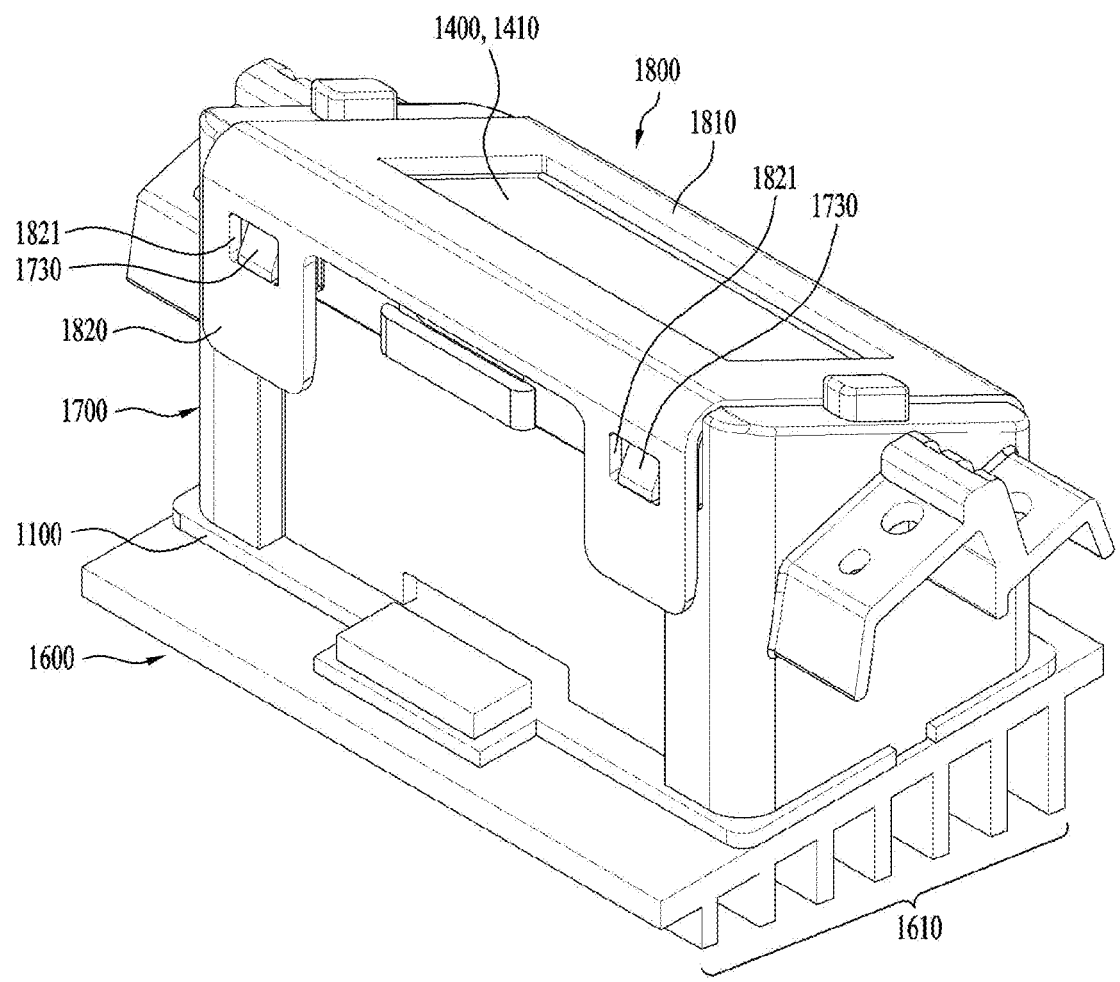
FIG. 24 is a back-side perspective view corresponding to FIG. 21.

FIG. 23 is a perspective view illustrating the holder 1800 of the embodiment. FIG. 24 is a back-side perspective view corresponding to FIG. 21. As illustrated in FIG. 23, the head up display device may further include the holder 1800.

The holder 1800 is detachably coupled to the casing 1700. The holder 1800 may function to couple the display unit 1400 to the casing 1700. The holder 1800 may include a first mounting section 1810 and second mounting sections 1820.

The first mounting section 1810 is formed with an opening at a portion thereof corresponding to the image panel 1410 of the display unit 1400. It may be possible to mount the holder 1800 to the casing 1700 by pressing the display unit 1400. The second mounting sections 1820 extend from the first mounting section 1810 in a bent state. The second mounting sections 1820 are coupled to the casing 1700 and, as such, the holder 1800 may be mounted to the casing 1700.

In order to enable the holder 1800 to be detachably coupled to the casing 1700, the holder 1800 may be provided with second through holes 1821, and the casing 1700 may be provided with hooks 1730.

The second through holes 1821 may be provided at the second mounting sections 1820. In this case, it may be suitable for at least four second mounting sections 1820 to be provided, as illustrated in FIG. 23, in order to stably mount the display unit 1400 to the casing 1700. In this case, at least one second through hole 1821 may be provided at each second mounting section 1820.

The hooks 1730 are formed at side portions of the casing 1700 to protrude from the side portions of the casing 1700. The second through holes 1821, which are formed at the second mounting sections 1820, may receive the hooks 1730, respectively. In this case, the second mounting sections 1820 have elasticity and, as such, the holder 1800 may be easily detachably coupled to the casing 1700.

In accordance with the above-described structures, it may be possible to easily mount or separate the display unit 1400 to or from the casing 1700, using the holder 1800, without using thread fastening.

Meanwhile, it may be possible to adjust pressing force applied to the display unit 1400 by the holder 1800 by adjusting the size of the second through holes 1821, the positions of the second through holes 1821 at the second mounting sections 1820, etc. It may be possible to firmly couple the display unit 1400 to the casing 1700 by increasing the pressing force.

Figure 25:
FIG. 25 illustrates an image displayed on a display unit in a head up display device having a configuration in which the center of a light emitting element coincides with the center of a convex lens section.

FIG. 25 illustrates an image displayed on the display unit 1400 in a head up display device having a configuration in which the center of the light emitting element 1110 coincides with the center of the convex lens section 1230.

Figure 26:
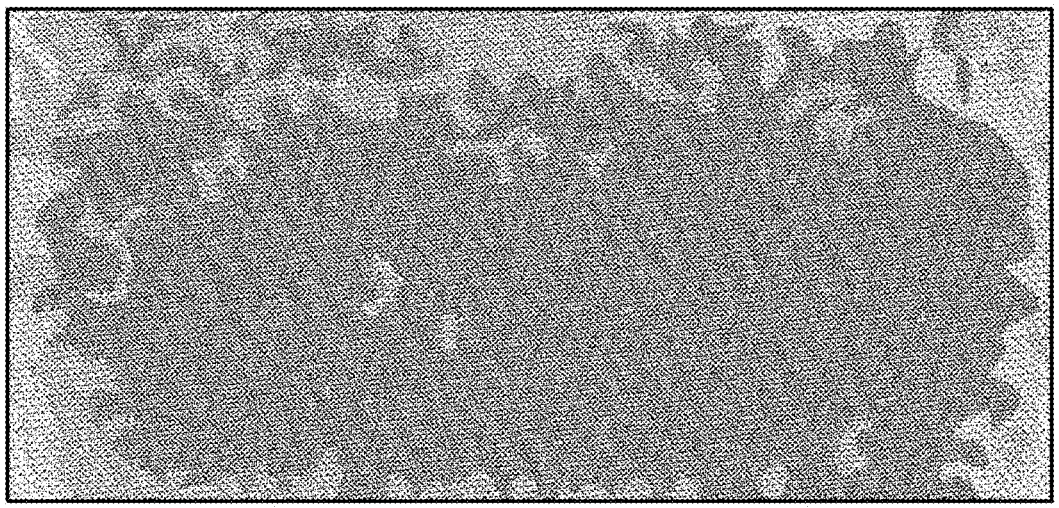
FIG. 26 illustrates an image disposed on a display unit in the head up display device of the embodiment having a configuration in which the center of a light emitting element and the center of a convex lens section are spaced apart from each other in a direction perpendicular to a first direction.

FIG. 26 illustrates an image disposed on the display unit 400 in the head up display device of the embodiment having a configuration in which the center of the light emitting element 1110 and the center of the convex lens section 1230 are spaced apart from each other in a direction perpendicular to the first direction.

In an experiment, the distance DL between the center of the light emitting element 1110 and the center of the convex lens section 1230 was set to about ¼ of the width WL of the convex lens section 1230 in the third direction.

In this case, FIG. 25 shows an image obtained in the head up display device compared to the head up display device of the embodiment. FIG. 26 shows an image obtained in the head up display device of the embodiment. In FIGS. 25 and 26, image portions having equal or very similar colors or lightness mean that the image portions have equal or very similar brightness.

The light uniformity in the image of FIG. 25 was measured to be about 75%, whereas the light uniformity in the image of FIG. 26 was measured to be about 85%. Accordingly, it may be confirmed that the configuration, in which the center of the light emitting element 1110 and the center of the convex lens section 1230 are spaced apart from each other in a direction perpendicular to the first direction, exhibits an increase in light uniformity by about 10%, as compared to the configuration in which the center of the light emitting element 1110 coincides with the center of the convex lens section 1230.

In addition, after comparison between the images of FIGS. 25 and 26, it can be seen that the image of FIG. 26 exhibits more uniform light distribution in the entirety thereof, as compared to the image of FIG. 25. Accordingly, after comparison between the images of FIGS. 25 and 26, it can be clearly seen that, in the head up display device of the embodiment, the display unit 1400 thereof has light uniformity enhancement effects.

Although several embodiments have been described, other embodiments may be implemented in various forms. The technical contents of the above-described embodiments may be combined in various forms, so long as there is no compatibility thereamong, and new embodiments may be implemented through such combination.

INDUSTRIAL APPLICABILITY

In each embodiment, it may be possible to enhance light diffusion effects of the light diffusion member and uniformity of light passing through the display unit by arranging the light diffusion member between the second light transfer member and the display unit and arranging the light diffusion member and the display unit in parallel.

The invention claimed is:

1. A head up display device comprising:
a light source unit;
a first light transfer member comprising a convex lens section disposed to face the light source unit in a first direction in parallel to an optical axis direction;
a second light transfer member comprising a light transmitting portion formed to have a curved shape having an upwardly convex upper surface and a downwardly convex lower surface, the light transmitting portion being disposed to face the first light transfer member in the optical axis direction;
a display unit disposed to face the light transmitting portion of the second light transfer member in the optical axis direction, the display unit receiving light emerging from the light transmitting portion of the second light transfer member; and
a light diffusion member disposed between the light transmitting portion of the second light transfer member and the display unit,
wherein the light source unit comprises a plurality of light emitting elements disposed in a second direction perpendicular to the first direction; wherein the convex lens section comprises a plurality of convex lenses disposed at positions respectively corresponding to the plurality of light emitting elements in the second direction,
wherein a center of each of the plurality of light emitting elements is spaced apart from a center of the corresponding convex lens in a third direction perpendicular to the first and second directions thereby causing light from the light source unit to be more uniformly distributed,
wherein the light source unit, the convex lens section, the light transmitting portion, and the display unit are aligned with each other in the first direction, and
wherein the display unit has a planar shape, and the light diffusion member has a planar shape, and the display unit is disposed to be inclined with respect to the optical axis direction, and the light diffusion member is disposed to be inclined with respect to the optical axis direction such that the light diffusion member is in parallel to the display unit.

2. The head up display device according to claim 1, wherein a first virtual line extending in a lateral direction of the display unit and a second virtual line extending in the optical axis direction form an acute angle or an obtuse angle therebetween, and a third virtual line extending in a lateral direction of the light diffusion member is in parallel to the first virtual line.

3. The head up display device according to claim 1, wherein a first distance as a minimum distance between facing surfaces of the display unit and the light diffusion member is shorter than a second distance as a minimum distance between facing surfaces of the second light transfer member and the light diffusion member.

4. The head up display device according to claim 1, wherein the light diffusion member is formed with embossed portions, at least a part of the embossed portions having an oval shell shape or a spherical shell shape.

5. The head up display device according to claim 4, wherein each of the embossed portions is configured such that a plane contacting an uppermost surface of the respective embossed portion forms a predetermined angle with respect to a tangent line of another surface of the respective embossed portion, and a first angle as a maximum angle between the tangent line and the plane in a cross-section of the oval shell-shaped embossed portion taken along a longer axis of the embossed portion is in a range of 5° to 30°.

6. The head up display device according to claim 5, wherein a second angle as a maximum angle between the tangent line and the plane in a cross-section of the oval shell-shaped embossed portion taken along a shorter axis of the embossed portion is 10° to 60°.

7. The head up display device according to claim 6, wherein the second angle is equal to or greater than the first angle.

8. The head up display device according to claim 1, comprising a first heat dissipation member coupled to the light source unit and comprising a plurality of first heat dissipation fins.

9. The head up display device according to claim 1, comprising:
  a casing configured to receive the first light transfer member, the second light transfer member, and the diffusion member; and
  a holder configured to couple the display unit to the casing.

10. The head up display device according to claim 9, wherein the casing comprises a second heat dissipation member formed at a side portion thereof and includes a second heat dissipation fin.

11. The head up display device according to claim 1, wherein the first light transfer member comprises a first flange protruded from a lower surface of the first light transfer member to space the light source unit and the first light transfer member apart from each other in the optical axis direction.

12. The head up display device according to claim 11, wherein the first light transfer member comprises a second flange protruded from an upper surface of the first light transfer member to space the first light transfer member and the second light transfer member apart from each other in the optical axis direction.

13. The head up display device according to claim 12, wherein the second light transfer member comprises a third flange protruded from a lower surface of the second light transfer member to space the first light transfer member and the second light transfer member apart from each other in the optical axis direction.

14. The head up display device according to claim 13, wherein a first protrusion is formed at an upper surface of the second flange, and a first groove is formed at a lower surface of the third flange at a position corresponding to the first protrusion such that the first protrusion is inserted into the first groove.

15. The head up display device according to claim 13, wherein a first protrusion is formed at a lower surface of the third flange, and a first groove is formed at an upper surface of the second flange at a position corresponding to the first protrusion such that the first protrusion is inserted into the first groove.

16. A head up display device comprising:
  a light source unit;
  a first light transfer member comprising a convex lens section disposed to face the light source unit in a first direction in parallel to an optical axis direction;
  a second light transfer member comprising a light transmitting portion formed to have a curved shape having an upwardly convex upper surface and a downwardly convex lower surface, the light transmitting portion being disposed in the optical axis direction of the light source unit to face the first light transfer member;
  a display unit disposed in the Optical axis direction of the light source unit to face the light transmitting portion of the second light transfer member, the display unit receiving light emerging from the light transmitting portion of the second light transfer member; and
  a light diffusion member disposed between the light transmitting portion of the second light transfer member and the display unit,
  wherein the light source unit comprises a plurality of light emitting elements disposed in a second direction perpendicular to the first direction;
  wherein the convex lens section comprises a plurality of convex lenses disposed at positions respectively corresponding to the plurality of light emitting elements in the second direction,
  wherein a center of each of the plurality of light emitting elements is spaced apart from a center of the corresponding convex lens in a third direction perpendicular to the first and second directions thereby causing light from the light source unit to be more uniformly distributed,
  wherein the display unit has a planar shape, and the light diffusion member has a planar shape, and the display unit is disposed to be inclined with respect to the optical axis direction, and the light diffusion member is disposed to be inclined with respect to the optical axis direction such that the light diffusion member is in parallel to the display unit, and
  wherein a first angle between a first virtual line extending in a lateral direction of the display unit and a second virtual line extending in the optical axis direction is equal to a second angle between the second virtual line and a third virtual line extending in a lateral direction of the light diffusion member.

17. A head up display device comprising:
  a light source unit comprising a light emitting element;
  a first light transfer member disposed in a first direction in parallel to an optical axis direction of the light source unit, comprising a convex lens section corresponding to the light emitting element;
  a second light transfer member comprising a light transmitting portion formed to have a curved shape having an upwardly convex upper surface and a downwardly convex lower surface, the light transmitting portion being disposed in the optical axis direction of the light source unit to face the first light transfer member; and
  a display unit disposed in the optical axis direction of the light source unit to face the light transmitting portion of the second light transfer member, the display unit receiving light emerging from the light transmitting portion of the second light transfer member; and
  a light diffusion member disposed between the light transmitting portion of the second light transfer member and the display unit,
  wherein the display unit has a planar shape, and the light diffusion member has a planar shape, and the display unit is disposed to be inclined with respect to the optical axis direction, and the light diffusion member is disposed to be inclined with respect to the optical axis direction such that the light diffusion member is in parallel to the display unit, and
  wherein the light source unit comprises a plurality of light emitting elements disposed in a second direction perpendicular to the first direction;

wherein the convex lens section comprises a plurality of convex lenses disposed at positions respectively corresponding to the plurality of light emitting elements in the second direction, wherein a center of each of the plurality of light emitting elements is spaced apart from a center of the corresponding convex lens in a third direction perpendicular to the first and second directions thereby causing light from the light source unit to be more uniformly distributed, and wherein the center of the light emitting element is closer to one end of the display unit than the other end of the display unit.

* * * * *